United States Patent
Kadlec et al.

(10) Patent No.: US 9,822,221 B2
(45) Date of Patent: Nov. 21, 2017

(54) CROSS-LINKED COMPOSITION AND METHOD OF FORMING THE SAME

(71) Applicant: Dow Corning Corporation, Midland, MI (US)

(72) Inventors: Donald A. Kadlec, Midland, MI (US); Kimmai T. Nguyen, Midland, MI (US); Kenneth E. Zimmerman, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 14/912,174

(22) PCT Filed: Oct. 29, 2014

(86) PCT No.: PCT/US2014/062877
§ 371 (c)(1),
(2) Date: Feb. 16, 2016

(87) PCT Pub. No.: WO2015/066165
PCT Pub. Date: May 7, 2015

(65) Prior Publication Data
US 2016/0194456 A1    Jul. 7, 2016

Related U.S. Application Data

(60) Provisional application No. 61/898,036, filed on Oct. 31, 2013, provisional application No. 61/898,404, filed on Oct. 31, 2013, provisional application No. 61/898,042, filed on Oct. 31, 2013, provisional application No. 61/898,045, filed on Oct. 31, 2013.

(51) Int. Cl.
C08G 77/48   (2006.01)
C08G 77/54   (2006.01)
C08L 83/14   (2006.01)
C08G 77/14   (2006.01)
C08G 77/26   (2006.01)

(52) U.S. Cl.
CPC ............. *C08G 77/48* (2013.01); *C08G 77/54* (2013.01); *C08L 83/14* (2013.01); *C08G 77/14* (2013.01); *C08G 77/26* (2013.01)

(58) Field of Classification Search
CPC ....... C08G 77/26; C08G 77/16; C08G 77/455
See application file for complete search history.

(56) References Cited

U.S. PATENT DOCUMENTS

| | | | |
|---|---|---|---|
| 4,395,527 A * | 7/1983 | Berger | C07F 7/0852 257/791 |
| 4,605,567 A | 8/1986 | Muller et al. | |
| 4,658,049 A | 4/1987 | Nakano et al. | |
| 4,794,153 A | 12/1988 | Rich | |
| 4,795,680 A | 1/1989 | Rich et al. | |
| 4,876,152 A | 10/1989 | Kang | |
| 4,945,148 A | 7/1990 | Rich et al. | |
| 4,987,169 A | 1/1991 | Kuwata et al. | |
| 5,015,700 A | 5/1991 | Herzig et al. | |
| 5,236,986 A | 8/1993 | Sakuta | |
| 5,247,111 A | 9/1993 | O'Lenick, Jr. | |
| 5,248,783 A | 9/1993 | O'Lenick | |
| 5,272,241 A | 12/1993 | Lucarelli et al. | |
| 5,280,019 A | 1/1994 | Klimisch | |
| 5,385,999 A | 1/1995 | D'Anvers et al. | |
| 5,412,074 A | 5/1995 | Jones et al. | |
| 5,596,061 A | 1/1997 | Berger et al. | |
| 5,637,746 A | 6/1997 | Knebelkamp et al. | |
| 5,654,362 A | 8/1997 | Schulz, Jr. et al. | |
| 5,686,011 A | 11/1997 | Lohmann et al. | |
| 5,702,490 A | 12/1997 | Kneip et al. | |
| 5,736,583 A | 4/1998 | Berger et al. | |
| 5,760,116 A | 6/1998 | Kilgour et al. | |

(Continued)

FOREIGN PATENT DOCUMENTS

| | | |
|---|---|---|
| DE | 3618714 A1 | 11/1987 |
| EP | 1900765 | 3/2008 |

(Continued)

OTHER PUBLICATIONS

English language abstract and machine-assisted English translation for EP1900765(A1) extracted from http://worldwide.espacenet.com on Jan. 13, 2017, 21 pages.
English language abstract and machine-assisted English translation for DE3618714(A1) extracted from http://worldwide.espacenet.com on Jan. 13, 2017, 14 pages.
PCT/US2014/062873 International Search Report dated Jan. 22, 2015, 3 pages.
PCT/US2014/062877 International Search Report dated Jan. 20, 2015, 4 pages.
PCT/US2014/062942 International Search Report dated Feb. 11, 2015, 4 pages.
English language abstract and machine-assisted English translation for JP3678420(B2) extracted from https://patents.google.com on Jan. 13, 2017, 57 pages.

*Primary Examiner* — Kuo-Liang Peng
(74) *Attorney, Agent, or Firm* — Warner Norcross & Judd LLP

(57) ABSTRACT

A cross-linked composition comprises the reaction product of a first reactant having at least one hydroxyl or amine (functional) group, a second reactant having at least one hydroxyl or amine (functional) group, and a siloxane having at least two terminal anhydride groups reactive with the functional groups of the first and second reactants. The first reactant is selected from the group of first siloxanes having at least one hydroxyl or amine group, a first organic alcohol having at least one hydroxyl group, a first organic amine having at least one amine group, or combinations thereof. The second reactant is selected from the group of second siloxanes having at least one hydroxyl or amine group, a second organic alcohol having at least one hydroxyl group, a second organic amine having at least one amine group, or combinations thereof. If utilized, the first siloxanes and/or second siloxanes are different from the siloxane.

18 Claims, No Drawings

(56) References Cited

U.S. PATENT DOCUMENTS

| | | |
|---|---|---|
| 5,811,487 A | 9/1998 | Schulz, Jr. et al. |
| 5,854,356 A | 12/1998 | Bergstrom et al. |
| 5,880,210 A | 3/1999 | Schulz, Jr. et al. |
| 5,902,360 A | 5/1999 | Linzell |
| 5,929,162 A | 7/1999 | Horne et al. |
| 5,969,035 A | 10/1999 | Meinhardt et al. |
| 6,007,801 A | 12/1999 | Hossel et al. |
| 6,020,409 A | 2/2000 | Alvarez et al. |
| 6,110,230 A | 8/2000 | Friedrich et al. |
| 6,124,490 A | 9/2000 | Gormley et al. |
| 6,200,581 B1 | 3/2001 | Lin et al. |
| 6,238,657 B1 | 5/2001 | Lin et al. |
| 6,262,170 B1 | 7/2001 | Kilgour et al. |
| 6,271,295 B1 | 8/2001 | Powell et al. |
| 6,355,724 B1 | 3/2002 | LeGrow et al. |
| 6,365,670 B1 | 4/2002 | Fry |
| 6,423,322 B1 | 7/2002 | Fry |
| 6,444,745 B1 | 9/2002 | Kilgour et al. |
| 6,455,640 B2 | 9/2002 | Okawa |
| 6,503,519 B1 | 1/2003 | Sakuta |
| 6,531,540 B1 | 3/2003 | O'Brien |
| 6,538,061 B2 | 3/2003 | Chaiyawat et al. |
| 6,565,837 B2 | 5/2003 | Fost et al. |
| 6,602,947 B2 | 8/2003 | Merz et al. |
| 6,653,378 B2 | 11/2003 | Ferritto et al. |
| 6,716,908 B2 | 4/2004 | Lomas et al. |
| 6,747,115 B2 | 6/2004 | Sakuta |
| 6,770,708 B2 | 8/2004 | Kadlec et al. |
| 6,797,742 B2 | 9/2004 | Kilgour et al. |
| 6,838,541 B2 | 1/2005 | Lin et al. |
| 6,881,416 B2 | 4/2005 | Fry |
| 6,887,836 B2 | 5/2005 | Majeti et al. |
| 7,019,098 B2 | 3/2006 | Hupfield |
| 7,163,674 B2 | 1/2007 | Majeti et al. |
| 7,166,276 B2 | 1/2007 | Stephens et al. |
| 7,241,835 B2 | 7/2007 | O'Brien et al. |
| 7,279,223 B2 | 10/2007 | Rubinsztajn et al. |
| 7,413,744 B2 | 8/2008 | Ichinohe |
| 7,790,827 B2 | 9/2010 | Nguyen et al. |
| 8,013,094 B2 | 9/2011 | Okawa et al. |
| 8,026,330 B2 | 9/2011 | Kamei |
| 8,110,630 B2 | 2/2012 | Lin et al. |
| 8,147,854 B2 | 4/2012 | Okawa et al. |
| 8,273,840 B2 | 9/2012 | Lin |
| 8,338,630 B2 | 12/2012 | Moriya |
| 8,398,964 B2 | 3/2013 | Kamei et al. |
| 8,455,603 B2 | 6/2013 | Ferenz et al. |
| 8,586,669 B2 | 11/2013 | Kennan et al. |
| 8,653,190 B2 | 2/2014 | Chatterjee et al. |
| 8,912,354 B2 | 12/2014 | Kamei |
| 8,920,783 B2 | 12/2014 | Lin |
| 9,243,113 B2 | 1/2016 | Ahn et al. |
| 2003/0082129 A1 | 5/2003 | Buckinham et al. |
| 2004/0138376 A1 | 7/2004 | Awad |
| 2004/0234477 A1 | 11/2004 | Sakuta |
| 2006/0127338 A1 | 6/2006 | Morita et al. |
| 2008/0076886 A1* | 3/2008 | Burns ............... C08G 18/3206 525/540 |
| 2009/0317343 A1 | 12/2009 | Lin et al. |
| 2010/0135916 A1 | 6/2010 | Courel et al. |
| 2010/0215595 A1 | 8/2010 | Kennan et al. |
| 2010/0233104 A1 | 9/2010 | Drake et al. |
| 2010/0303743 A1 | 12/2010 | Kennan et al. |
| 2010/0330011 A1 | 12/2010 | Kennan et al. |
| 2011/0052523 A1 | 3/2011 | Moriya et al. |
| 2012/0219517 A1 | 8/2012 | Ahn et al. |
| 2013/0041084 A1 | 2/2013 | Chatterjee et al. |
| 2016/0199286 A1 | 7/2016 | Mary Kay et al. |
| 2016/0200876 A1 | 7/2016 | Kadlec et al. |

FOREIGN PATENT DOCUMENTS

| | | |
|---|---|---|
| EP | 1900765 A1 | 3/2008 |
| EP | 2418236 A1 | 2/2012 |
| JP | 2740590 | 1/1998 |
| JP | 2003146832 | 5/2003 |
| JP | 2003292415 | 10/2003 |
| JP | 3678420 B2 | 8/2005 |
| JP | 2010265338 | 11/2010 |
| WO | 03041664 | 5/2003 |
| WO | 2015066161 | 5/2015 |
| WO | 2015066165 | 5/2015 |
| WO | 2015066199 | 5/2015 |

* cited by examiner

CROSS-LINKED COMPOSITION AND METHOD OF FORMING THE SAME

CROSS-LINKED COMPOSITION AND METHOD OF FORMING THE SAME

This application is a national stage entry of International Patent Application No. PCT/US2014/62877, filed Oct. 29, 2014, which claims the benefit of U.S. Provisional Patent Application Nos. 61/898,036, 61/898,040, 61/898,042, and 61/898,045, each filed on Oct. 31, 2013, the disclosures of which are incorporated by reference.

The present invention generally relates to a cross-linked composition comprising the reaction product of a first reactant having at least one functional group, a second reactant having at least one functional group, and a siloxane having at least two terminal anhydride groups reactive with the functional groups of the first and second reactants. The functional groups of the reactants are at least one of hydroxyl groups or amine groups. The present invention also generally relates to a method of forming the cross-linked composition.

Silicone elastomer gels/blends have been used extensively to enhance the aesthetics of personal care formulations for skin care and healthcare by providing a unique sensory profile upon application. For example, such gels/blends can provide sensory characteristics such as a velvety, silky or powdery feel. In addition, such gels/blends are also valued for providing rheology modification to personal care (e.g. skin, sun, cosmetic) and healthcare formulations.

Most silicone elastomer gels are obtained by a cross-linking hydrosilylation reaction of a SiH functional polysiloxane with another polysiloxane containing an unsaturated hydrocarbon substituent, such as a vinyl functional polysiloxane, or by cross-linking a SiH functional polysiloxane with a hydrocarbon diene or with a terminally unsaturated polyoxyalkylene (e.g. PEG/PPG). These silicone elastomer gels are compatible with mostly non-polar organic solvents. Unfortunately, such silicone elastomer gels have limited versatility in formulations with polar solvents such as hydrocarbon oils, ester oils and plant based oils. In view of the foregoing, there remains an opportunity to provide silicones with increased formulation versatility, as well as to provide silicones having excellent aesthetic and rheological properties.

BRIEF SUMMARY OF THE INVENTION

Disclosed is a cross-linked composition. The cross-linked composition comprises the reaction product of a first reactant having at least one hydroxyl or amine group, a second reactant having at least one hydroxyl or amine group, and a siloxane having at least two terminal anhydride groups reactive with the groups of the first and second reactants.

The first reactant is selected from the group of a first siloxane having at least one hydroxyl group, a first siloxane different from the siloxane and having at least one amine group, a first organic alcohol having at least one hydroxyl group, a first organic amine having at least one amine group, or combinations thereof.

The second reactant is selected from the group of a second siloxane different from the siloxane and having at least one hydroxyl group, a second siloxane different from the siloxane and having at least one amine group, a second organic alcohol having at least one hydroxyl group, a second organic amine having at least one amine group, or combinations thereof.

In a first embodiment of the disclosure, the first reactant comprises the first siloxane having at least one hydroxyl group and the second reactant comprises the second siloxane having at least one hydroxyl group, i.e., the reactants are hydroxyl functional siloxanes. In a second embodiment of the disclosure, the first reactant comprises the first siloxane having at least one amine group and the second reactant comprises the second siloxane having at least one amine group, i.e., the reactants are amine functional siloxanes.

In a third embodiment of the disclosure, the first reactant comprises the first organic alcohol and the second reactant comprises the second organic alcohol, i.e., the reactants are organic alcohols. In a fourth embodiment of the disclosure, the first reactant comprises the first organic amine and the second reactant comprises the second organic amine, i.e., the reactants are organic amines.

In the first and second embodiments of the disclosure, the cross-linked composition is typically of the following general formula (I):

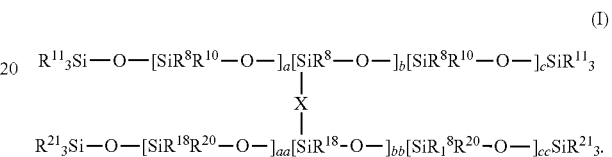

Each X is of the following general formula (i):

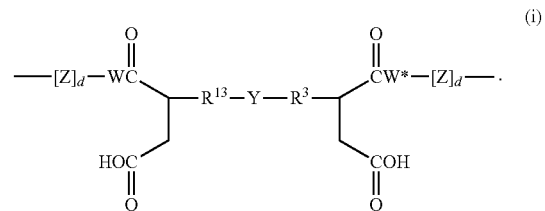

Each Y is of the following formula (ii):

Each of W and W* is independently an oxygen atom (O) or N—R, with R independently being a hydrogen atom (H) or $R^1$. Each of Z, $R^3$, and $R^{13}$ is an independently selected divalent group. Each of $R^1$, $R^2$, $R^4$, $R^5$, $R^8$, $R^{18}$, $R^{10}$, $R^{20}$, $R^{11}$, and $R^{21}$ is an independently selected substituted or unsubstituted hydrocarbyl group. Each of a and aa is an independently selected integer from 0 to 1,000. Each of b and bb is an independently selected integer from 1 to 200. Each of c and cc is an independently selected integer from 0 to 1,000. Each d is independently 0 or 1. Further, w is an integer selected from 0 to 1,000, x is an integer selected from 0 to 100, and y is an integer selected from 0 to 1,000.

In the third and fourth embodiments of the disclosure, the cross-linked composition is typically of the following general formula (II):

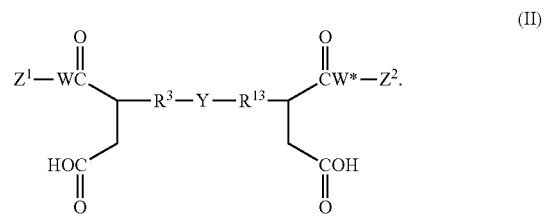

Each Y is of the following formula (ii):

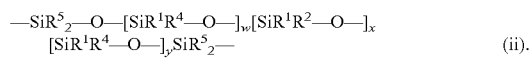
(ii).

Each of $Z^1$ and $Z^2$ is independently attributable to the organic alcohol or the organic amine. Each of W, W*, $R^3$, $R^{13}$, $R^1$, $R^2$, $R^4$, $R^5$, w, x, and y is as above.

Also disclosed is a method of forming the cross-linked composition. The method comprises the steps of providing the first reactant, providing the second reactant, and providing the siloxane. The method further comprises the step of combining the first reactant, second reactant, and siloxane to form the cross-linked composition.

DETAILED DESCRIPTION OF THE INVENTION

Disclosed are a cross-linked composition ("composition") and a method of forming the composition ("method"). The composition comprises the reaction product of a first reactant, a second reactant, and a siloxane. The first and second reactants are referred to collectively as "the reactants". In certain embodiments, the composition consists essentially of the reaction product of the reactants and siloxane. In further embodiments, the composition consists of the reaction product of the reactants and siloxane. In certain embodiments, the composition can include one or more siloxanes in addition to, and different from, the reactants and siloxane.

The first reactant has at least one functional group. The functional group can be a hydroxyl group or an amine group. The first reactant is selected from the group of a first siloxane having at least one hydroxyl group or amine group (i.e., a first hydroxyl functional siloxane or a first amine functional siloxane), a first organic alcohol having at least one hydroxyl group, a first organic amine having at least one amine group, or combinations thereof. The first siloxane is different from the siloxane.

The second reactant also has at least one functional group. The functional group can be a hydroxyl group or an amine group. The second reactant is selected from the group of a second siloxane having at least one hydroxyl group or amine group (i.e., a second hydroxyl functional siloxane or a second amine functional siloxane), a second organic alcohol having at least one hydroxyl group, a second organic amine having at least one amine group, or combinations thereof. The second siloxane is different from the siloxane and may be the same as or different from the first siloxane. The second organic alcohol may be the same as or different from the first organic alcohol. The second organic amine may be the same as or different from the first organic amine.

In a first general embodiment of the disclosure ("first embodiment"), the first reactant comprises the first hydroxyl functional siloxane and the second reactant comprises the second hydroxyl functional siloxane. The first and second hydroxyl functional siloxanes are referred to collectively as "the hydroxyl functional siloxanes". In the first embodiment, each of the reactants may also individually consist essentially of, or consist of, their respective hydroxyl functional siloxanes.

In a second general embodiment of the disclosure ("second embodiment"), the first reactant comprises the first amine functional siloxane and the second reactant comprises the second amine functional siloxane. The first and second amine functional siloxanes are referred to collectively as "the amine functional siloxanes". In the second embodiment, each of the reactants may also individually consist essentially of, or consist of, their respective amine functional siloxanes.

In a third general embodiment of the disclosure ("third embodiment"), the first reactant comprises the first organic alcohol and the second reactant comprises the second organic alcohol. The first and second organic alcohols are referred to collectively as "the alcohols". In the third embodiment, each of the reactants may also individually consist essentially of, or consist of, their respective alcohols.

In a fourth general embodiment of the disclosure ("fourth embodiment"), the first reactant comprises the first organic amine and the second reactant comprises the second organic amine. The first and second organic amines are referred to collectively as "the amines". In the fourth embodiment, each of the reactants may also individually consist essentially of, or consist of, their respective amines.

In further embodiments, at least one of the reactants comprises a combination of two or more of the aforementioned components, e.g. the first reactant comprises a hydroxyl functional siloxane and an organic alcohol, a hydroxyl functional siloxane and an organic amine, hydroxyl and amine functional siloxanes, organic alcohols and amines, etc.

The siloxane has at least two terminal anhydride groups reactive with the functional groups of the reactants. In the first and second embodiments, the siloxane may also be referred to as "the third siloxane" to distinguish from the first and second siloxanes (i.e., the siloxanes).

Typically, the siloxane has two terminal anhydride groups. The siloxane can also be free of pendant anhydride groups. Typically, each of the anhydride groups is directly bonded to an intervening atom or linkage that is directly bonded to a silicon atom. The anhydride groups are useful for reaction with the reactants, and can also impart additional functionality to the composition. It is thought that potential benefits provided by, or attributable to, the anhydride groups include, but are not limited to, film forming, substantivity, durability, pigment/particle suspension and/or modification, long lasting/wear, additional chemistry, actives (e.g. drug) or inactives (e.g. fragrance) delivery/release, hydrophilicity, reactivity, compatibility, polarity, and combinations thereof. In certain embodiments, the anhydride groups can provide free carboxyl groups, which can also provide benefits and/or be available for a subsequent, non-limiting reaction. In other embodiments, the composition may have one or more free anhydride groups for a subsequent, non-limiting reaction.

Each of the reactants can be chemically (or physically) the same, such as two separate molecules of the same reactant component (or type). For example, the reactants can be provided together, such as in an "A-part" (or A-side) of a system for forming the composition. Alternatively, the reactants can be provided separately, especially when they are different from each other. This may be useful for formulation purposes. However, separation is not required, as the reactants are typically inert with respect to each other.

The siloxane can be provided separate from the reactants, such as in a "B-part" (or B-side) of a system for forming the composition. If the composition includes one or more optional additives, the additive(s) can be included with either of, each of, or a combination of, the system parts. The system may include more than two parts. Optionally, various types of conventional additives can be utilized depending, for example, on the end use of the composition. The disclosure is not limited to any particular arrangement of the system, or to any particular additive or additives. The siloxane is described in greater detail below.

The Siloxane

In various embodiments, the siloxane consists of siloxane bonds (Si—O—Si) within its backbone. Alternatively, the siloxane may include siloxane bonds separated by one or more divalent groups, e.g. a —CH$_2$— linking group. Further examples of suitable divalent groups include polyether groups, e.g. a —CH$_2$CH$_2$O— linking group (i.e., an EO group), a —CH(CH$_3$)CH$_2$O— linking group (i.e., a PO group), etc. Combinations of different divalent groups may be present within its backbone. Each of the divalent groups may be singular or repeated, e.g. 2 times, 5 times, 10 times, >10 times, etc. In certain embodiments, the siloxane is free of polyether groups.

In various embodiments, the siloxane comprises at least one [SiR$^1$R$^2$—O—] unit ("D" or R*$_2$SiO$_{2/2}$ units). Typically, the siloxane has repeating D units, which generally constitute linear portions of the siloxane. The siloxane typically has substituted terminal R*$_3$SiO$_{1/2}$ units ("M" units).

In certain embodiments, the siloxane may optionally be branched, partially branched, and/or may include a resinous portion having a three-dimensional networked structure. In such embodiments, the siloxane may further comprise R*SiO$_{3/2}$ units ("T" units) and/or SiO$_{4/2}$ units ("Q" units). Branching of the siloxane itself, or the resinous portion of the siloxane, if present, can be attributable to the presence of T and/or Q units. Branching may also be attributable to side groups of one or more D units. In various embodiments, the siloxane is free of T units, Q units, or both T and Q units.

With reference to the [SiR$^1$R$^2$—O—] unit, R$^1$ is an independently selected substituted or unsubstituted hydrocarbyl group. By "substituted," it is meant that one or more hydrogen atoms of the hydrocarbon may be replaced with atoms other than hydrogen (e.g. a halogen atom), or a carbon atom within the chain of R$^1$ may be replaced with an atom other than carbon, i.e., R$^1$ may include one or more heteroatoms within the chain, such as oxygen, sulfur, nitrogen, etc. Examples of suitable hydrocarbyl groups represented by R$^1$ include alkyl, aryl, alkenyl, alkaryl, and aralkyl, groups.

In certain embodiments, R$^1$ is an independently selected alkyl group typically having from 1 to 20, 1 to 15, 1 to 10, 1 to 6, 1 to 4, or 1 to 2, carbon atoms, or any number of carbon atoms in between. Specific examples of suitable alkyl groups as R$^1$ include methyl groups, ethyl groups, propyl groups, butyl groups, pentyl groups, etc. Typically, R$^1$ is a methyl group (i.e., —CH$_3$). Examples of suitable groups for R$^2$ are as described for R$^1$.

In various embodiments, the siloxane is of the following general formula (A):

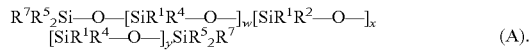

(A).

In further embodiments, the siloxane is of the following general formula (A1):

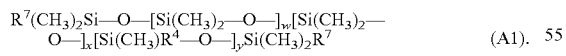

(A1).

In formulas (A) and (A1), each of R$^1$ and R$^2$ are as described above. R$^4$ can be of various chemistries, including organic, inorganic, and combinations thereof. In various embodiments, each of R$^4$ and R$^5$ can be an independently selected substituted or unsubstituted hydrocarbyl group. Examples of suitable groups for each of R$^4$ and R$^5$ are as described for R$^1$. In certain embodiments, each R$^4$ is an independently selected alkyl group, aryl group, or (R$^6$O)$_m$ group. If R$^4$ is a (R$^6$O)$_m$ group, R$^6$ is typically an alkyl group or aryl group and m is an integer selected from 1 to 50, 1 to 25, 1 to 10, 1 to 5, or 1, or any number in between. The (R$^6$O)$_m$ group may also be referred to as a polyether group.

In specific embodiments, R$^4$ is an independently selected alkyl group having from 2 to 20, 2 to 15, 2 to 10, 2 to 5, or 2, carbon atoms, or any number of carbon atoms in between. Without being bound or limited by any particular theory, it is thought that the organic compatibility of the composition, e.g. in a solvent, can be enhanced by having a long chain alkyl group on the siloxane backbone, e.g. as R$^4$. In alternate embodiments, R$^4$ may be silicone side chain of the siloxane. The groups represented by subscripts w, x, and y, i.e., the groups having square brackets in formulas (A) and (A1), may be present in any order within the siloxane, including a different order than that which is represented above and throughout this disclosure. Moreover, these groups may be present in randomized or block form.

Typically, R$^4$ is either an alkyl group or a polyether group. Without being bound or limited to any particular theory, it is thought that the hydrophilic character of the composition can be enhanced by having a polyether side chain (or chains) on the siloxane backbone, e.g. as R$^4$. In other embodiments, R$^4$ is R$^7$. Typically, each R$^5$ is R$^1$. For example, each of R$^1$ and R$^5$ can be an alkyl group, e.g. a methyl group.

Typically, w is an integer selected from 0 to 1,000, 0 to 950, 0 to 750, 0 to 500, 0 to 400, 1 to 350, 1 to 300, 25 to 250, 50 to 200, 50 to 150, 75 to 125, 90 to 110, 90 to 100, or 90 to 95, or any number in between. Alternatively, w is an integer selected from 0 to 100, 0 to 90, 0 to 80, 0 to 70, 0 to 60, 1 to 50, 1 to 40, 1 to 30, 1 to 25, 1 to 20, 1 to 15, 1 to 10, 1 to 7.5, or 1 to 5, or any number in between. Typically, x is an integer selected from 1 to 100, 1 to 75, 1 to 50, 1 to 25, 1 to 20, 1 to 10, or 1 to 5, or any number in between. Alternatively, x is an integer selected from 0 to 100, 0 to 90, 0 to 80, 0 to 70, 0 to 60, 1 to 50, 1 to 40, 1 to 30, 1 to 25, 1 to 20, 1 to 15, 1 to 10, 1 to 7.5, or 1 to 5, or any number in between. Typically, y is an integer selected from 0 to 1,000, 0 to 950, 0 to 750, 0 to 500, 0 to 400, 1 to 350, 1 to 300, 1 to 250, 1 to 200, 1 to 150, 1 to 100, 1 to 75, 1 to 50, 1 to 25, 1 to 20, 1 to 15, 1 to 10, or 1 to 5, or any number in between. Alternatively, y is an integer selected from 0 to 100, 0 to 90, 0 to 80, 0 to 70, 0 to 60, 1 to 50, 1 to 40, 1 to 30, 1 to 25, 1 to 20, 1 to 15, 1 to 10, 1 to 7.5, or 1 to 5, or any number in between.

In various embodiments, w and y are not simultaneously 0. Said another way, in these embodiments, the siloxane includes at least one D unit associated with each of the x units and at least one of the w and y units in formula (A). In certain embodiments, the sum of w+x+y is from 25 to 1,500, 25 to 1,000, 25 to 900, 25 to 800, 25 to 700, 25 to 600, 25 to 500, 25 to 400, 25 to 300, 50 to 200, 75 to 150, 85 to 125, or 90 to 110, or any number in between. In these embodiments, x is at least 1, at least 10, at least 25, at least 50, at least 75, or at least 85. In this way, the siloxane has at least two, typically two, of the terminal anhydride groups and can have other side groups based on the presence of one or more D units associated with x, w, and/or y. In other embodiments, the siloxane is a dimer, such that each of w, x, and y is 0.

R$^7$ is a terminal anhydride group of the following general formula (B):

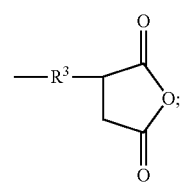

(B)

where R$^3$ is a divalent group. Typically, R$^3$ is a hydrocarbylene, heterohydrocarbylene, or organoheterylene group. In various embodiments, $R^3$ is $(CH_2)_n$ where n is an integer selected from 1 to 30, 1 to 25, 1 to 20, 1 to 15, 1 to 10, 1 to 5, or 1 to 3, or any number in between. Typically, n is 3. Embodiments of the reactants are described in greater detail below.

First and Second Embodiments

Each of the (first and second) siloxanes has at least one functional group reactive with the anhydride groups of the (third) siloxane. In the first embodiment, the functional groups are hydroxyl groups. In the second embodiment, the functional groups are amine groups. The hydroxyl groups and/or amine groups of the siloxanes are referred to collectively as the "functional groups". Each of the functional groups of the siloxanes can be pendant or terminal. Pendant groups may also be referred to as side groups, and are different from terminal groups sometimes referred to as end groups. In various embodiments, each of the siloxanes has one, alternatively two, functional groups. In certain embodiments, each of the siloxanes has pendant functional groups and is free of terminal functional groups. Each of the functional groups can be directly bonded to a silicon atom, or to an intervening atom or linkage that is directly bonded to a silicon atom.

Each of the hydroxyl groups can be primary, secondary, or tertiary, typically primary or secondary, more typically primary. Each of the amine groups can be primary or secondary, typically primary. The functional groups are useful for reaction with the third siloxane, and can also impart additional functionality to the composition. Typically, all of the functional groups of the siloxanes cross-link with anhydride groups of the third siloxane to form linkages (e.g. ester cross-links in the case with hydroxyl groups). Some amount of anhydride and/or carboxyl groups can remain free depending on the amount of functional groups present during reaction to form the composition. Such free groups can be useful for subsequent reaction(s) and/or can also interact with substrate surfaces, e.g. skin, leather, etc.

The siloxanes can each be any type of siloxane provided they have at least one functional group reactive with the terminal anhydride groups of the third siloxane. In this way, the third siloxane serves as a cross-linker between the siloxanes to thereby form the composition. The composition may constitute just one molecule of the third siloxane, or a plurality of molecules of the third siloxane depending, for example, on the number of functional groups attributable to the siloxanes.

In various embodiments, each of the siloxanes consists of siloxane bonds (Si—O—Si) within their backbones. Alternatively, each of the siloxanes may include siloxane bonds separated by one or more divalent groups. Examples of suitable divalent groups for the siloxanes are as like described for the third siloxane, e.g. —CH$_2$— linking groups. Combinations of different divalent groups may be present within each of their backbones. Each of the divalent groups may be singular or repeated.

In various embodiments, each of the siloxanes comprise at least one [SiR$^8$R$^9$—O—] unit. In these embodiments, each of the siloxanes typically has repeating D units. Each of the siloxanes also typically has terminal M units.

In certain embodiments, each of the siloxanes may optionally be branched, partially branched, and/or may include a resinous portion having a three-dimensional networked structure. In such embodiments, the siloxane polymers may further comprise T units, and/or Q units, and/or D units with side groups promoting such structures. Such M, D, T, and Q units can be as described for the third siloxane. In various embodiments, each of the siloxanes is free of T units, Q units, or both T and Q units. If the first/second siloxane is free of T and/or Q units, it may be referred to as a polysiloxane. If the first/second siloxane includes T and/or Q units, it may be referred to as a (silicone) resin. The siloxanes can be the same or different, e.g. one is linear and one is branched, both are branched, both are linear, etc.

With reference to the [SiR$^8$R$^9$—O—] unit, each of R$^8$ and R$^9$ can be an independently selected substituted or unsubstituted hydrocarbyl group. Examples of suitable groups for each of R$^8$ and R$^9$ are as described for R$^1$ and/or R$^4$. For example, each of R$^8$ and R$^9$ can be an alkyl group (e.g. a methyl group), an aryl group (e.g. a phenyl group), a polyether group (e.g. an EO group), etc. Each of R$^8$ and R$^9$ can the same or different.

In certain embodiments, at least one, or both, of the siloxanes is a polysiloxane individually of the following general formula (C):

where each R$^9$ is of the following formula (D):

In formula (C), each of R$^8$ and R$^9$ are as described above. Examples of suitable groups for R$^{11}$ are as described for R$^8$, e.g. R$^{11}$ can be an alkyl group. R$^{10}$ can be an independently selected substituted or unsubstituted hydrocarbyl group. Examples of suitable groups for R$^{10}$ are as described for R$^1$ and R$^4$. In certain embodiments, each R$^{10}$ is an independently selected alkyl group, aryl group, or $(R^{16}O)_{mm}$ group. If R$^{10}$ is a $(R^{16}O)_{mm}$ group, R$^{16}$ is typically an alkyl group or aryl group and mm is an integer selected from 1 to 50, 1 to 25, 1 to 10, 1 to 5, or 1, or any number in between. The $(R^{16}O)_{mm}$ group may also be referred to as a polyether group. In specific embodiments, R$^{10}$ is an independently selected alkyl group having from 2 to 20, 2 to 15, 2 to 10, 2 to 5, or 2, carbon atoms, or any number of carbon atoms in between. In alternate embodiments, R$^{10}$ may be silicone side chain of the siloxane. The groups represented by subscripts a, b, and c, i.e., the groups having square brackets in formula (C), may be present in any order within the siloxane, including a different order than that which is represented above and throughout this disclosure. Moreover, these groups may be present in randomized or block form.

In formula (D), V is OH or NR$_2$. Each R is independently a hydrogen atom (H) or R$^1$; typically each R is an H. In the first embodiment, V is OH. In the second embodiment, V is NR$_2$.

Each Z is a divalent group, and can independently comprise at least one of a hydrocarbylene, heterohydrocarbylene, or organoheterylene group. In certain embodiments, Z is a hydrocarbylene group having from 1 to 20, 1 to 10, 1 to 5, 1 to 2, 1, or 2, carbon atom(s), or any number of carbon atoms in between. Further examples of suitable groups for Z are as described with the optional divalent groups of the siloxanes, e.g. a —CH$_2$— linking group, an EO group, a PO group, etc., or combinations thereof.

In certain embodiments, Z comprises at least one structural unit selected from the group consisting of: [(CH$_2$)$_i$]$_k$; [(CH$_2$)$_i$O]$_k$; [(CH$_2$)$_i$(CH)(CH$_3$)O]$_k$; [(CH$_2$)$_i$(CH)(CH$_2$)$_j$(CH$_3$)O]$_k$; [(CH)OH]$_k$; [(CH)(CH$_2$)$_i$OH]$_k$; [(CH$_3$)$_2$COH(CH$_2$)$_i$]$_k$; [(CH$_3$)(CH$_2$)$_i$COH(CH$_2$)$_j$(CH$_3$)]$_k$; [(CH$_2$)$_i$NH(CH$_2$)$_i$]$_k$; [(CH$_2$)$_i$N(CH$_2$)$_j$(CH$_3$)]$_k$; and combinations thereof. In various embodiments, i is an integer selected from 1 to 100, 1 to 75, 1 to 50, 1 to 25, 1 to 10, 1 to 5, or 1, or any number in between; j is an integer selected from 1 to 100, 1 to 75, 1 to 50, 1 to 25, 1 to 10, 1 to 5, or 1, or any number in between; and k is an integer selected from 1 to 100, 1 to 75, 1 to 50, 1 to 25, 1 to 10, 1 to 5, or 1, or any number in between.

Z can be attributable to an alcohol. Specific examples of Z include structure units (or moieties) attributable to use of 4-penten-1-ol, 7-octen-1-ol, glycerol monoallyl ether, allyl xylitol, trimethylolpropane monoallyl ether, xylitol, pentaerythritol, triglycerol, aminopropyl, aminoethylaminoisobutyl, and combinations thereof. In certain embodiments, Z can include one or more pendant functional (e.g. hydroxyl and/or amine) groups in addition to the terminal functional (e.g. hydroxyl or amine) group attached thereto.

Z can also be attributable to a polyamine. In certain embodiments, the polyamine is a (poly)oxyalkylene compound. Suitable examples of such compounds include, but are not limited to, ethylene diamine, diethylene diamine, polyethylene diamine (e.g. having a molecular weight of 200 to 2,000), propylene diamine, dipropylene diamine, polypropylene diamine (e.g. having a molecular weight of 200 to 3,000), butylene diamine, dibutylene diamine, polybutylene diamine (e.g. having a molecular weight of 200 to 4,000), and combinations thereof.

In various embodiments, the polyamine can comprise a polyester polyamine, a polyether polyamine, a polyether/ester polyamine, or combinations thereof. Furthermore, the polyamine may be selected from aliphatic polyamines, cycloaliphatic polyamines, aromatic polyamines, heterocyclic polyamines, and combinations thereof. Some examples of suitable polyamines include, but are not limited to, glycol-initiated polyamines, glycerine-initiated polyamines, sucrose-initiated polyamines, sucrose/glycerine-initiated polyamines, trimethylolpropane-initiated polyamines, and combinations thereof.

Further examples of suitable polyamines include, but are not limited to, divalent and higher polyvalent primary or secondary, aliphatic, araliphatic, cycloaliphatic or aromatic amines. Specific examples include among others, 4-aminobenzylamines, 4,4'-diaminodicyclohexylmethane, phenylene diamines, etc. Polyamines such as diethylenetriamine, triethylenetetramine, diethylenepropylamine, N-(2-hydroxyethyl)diethylenetriamine, N,N'-di(2-hydroxyethyl)diethylenetriamine, m-phenylenediamine, methylenedianiline, aminoethyl piperazine, 4,4-diaminodiphenyl sulfone, benzyldimethylamine, dicyandiamide, and 2-methylimidazole, and triethylamine, can also be utilized.

Suitable aromatic diamines such as a diaminodiphenylsulfone, a methylenedianiline such as 4,4'-methylenedianiline, a diaminodiphenylether, benzidine, 4,4'-thiodianiline, 4-methoxy-6-m-phenylenediamine, 2,6-diaminopyridine, 2,4-toluenediamine, and dianisidine can be utilized. Further examples include alicyclic amines, such as menthane diamine and heterocyclic amines such as pyridine. In some cases, aliphatic amines such as secondary alkylamines can be utilized.

Further suitable diamines include, but are not limited to, the isomeric phenylene diamines, 4,4'-diaminobenzophenone, bis(4-amino)diphenyl ether and 2,2-bis(4-aminophenyl)propane.

Further examples of suitable polyamines include, but are not limited to, m-phenylenediamine, p-phenylenediamine, 4,4'-diaminodiphenyl ether, 3,4'-diaminodiphenyl ether, 4,4'-diaminodiphenylsulfone, 3,3'-diaminodiphenylsulfone, 2,2'-ditrifluoromethyl-4,4'-diaminobiphenyl, 9,9-bis(4-aminophenyl)fluorene, 9,9-bis(4-mino-3-methylphenyl)fluorene, bis[4-(4-aminophenoxy)phenyl]sulfone, bis[4-(3-aminophenoxy)phenyl]sulfone, 2,2-bis[4-(4-aminophenoxy)phenyl]propane, 3-(methylamino)propylamine, and 2,2-bis(4-aminophenyl)hexafluoropropane. Other examples include alkyl amines, propyl amine, isobutyl amine, alkyleneoxide amines, EO amines, PO amines, BO amines, etc. Combinations of different polyamines can be utilized to impart Z.

Typically, a is an integer selected from 0 to 1,000, 0 to 950, 0 to 750, 0 to 500, 0 to 400, 0 to 300, 0 to 200, 0 to 100, 0 to 75, 0 to 50, 0 to 25, 0 to 20, or 0 to 15, or any number in between. Typically b is an integer selected from 1 to 1,000, 1 to 950, 1 to 750, 1 to 500, 1 to 400, 1 to 300, or 1 to 200, or any number in between. Typically c is an integer selected from 0 to 1,000, 0 to 950, 0 to 750, 0 to 500, 0 to 400, 0 to 300, 0 to 200, 0 to 100, 0 to 75, 0 to 50, 0 to 25, 0 to 20, or 0 to 15, or any number in between. Typically each d is independently 0 or 1. In specific embodiments, at least one d is 1, or each d is 1.

In certain embodiments, at least one, or both, of the siloxanes is a resin of the general formula $R^*_s SiO_{(4-s)/2}$. Typically, a silicone resin will have T and/or Q units, along with M units and, optionally, D units. R* can be an independently selected substituted hydrocarbyl group, unsubstituted hydrocarbyl group, hydroxyl group, or amine group, and s is from 0 to 3. Suitable R* groups are as described for $R^8$, $R^9$, and $R^{10}$. Various combinations of such groups can be present, provided the silicone resin has at least two functional groups per molecule (typically on D units). In these embodiments, the resin generally includes a combination of M, D, T, and/or Q units. In specific embodiments, at least one, or both, of the siloxanes is a MDT resin, a MT resin, a MDQ resin, a MQ resin, or a MDTQ resin. Each of the M, D, and T units can have differing R* groups. The resin can be of various molecular weights, including, but not limited to, a number average molecular weight of from 800 to 500,000, or any number in between.

Third Embodiment

In various embodiments, at least one, or each, of the alcohols has one, alternatively two, hydroxyl groups. In other embodiments, at least one, or each, of the alcohols has three or more hydroxyl groups. Each of the hydroxyl groups can be pendant or terminal. Pendant groups may also be referred to as side groups, and are different from terminal groups sometimes referred to as end groups. In certain embodiments, each of the alcohols has pendant hydroxyl group(s) and is free of terminal hydroxyl groups. Each of the hydroxyl groups can be directly bonded to a carbon atom, or to an intervening atom or linkage that is directly bonded to a carbon atom. Each of the hydroxyl groups can be primary, secondary, or tertiary, typically primary or secondary, more typically primary. The hydroxyl groups are useful for reaction with the siloxane, and can also impart additional functionality to the composition. Typically, all of the hydroxyl groups of the alcohols cross-link with anhydride groups of the siloxane to form linkages (e.g. ester cross-links). Some amount of anhydride and/or carboxyl groups can remain free depending on the amount of hydroxyl groups present during reaction to form the composition. Such free groups can be useful for subsequent reaction(s) and/or can also interact with substrate surfaces, e.g. skin, leather, etc.

The alcohols can each be any type of alcohol provided they have at least one hydroxyl group reactive with the terminal anhydride groups of the siloxane. Optionally, other functional groups may also be present, e.g. amine groups. In this way, the siloxane serves as a cross-linker between the alcohols to thereby form the composition. The composition may constitute just one molecule of the siloxane, or a plurality of molecules of the siloxane depending, for example, on the number of hydroxyl groups attributable to the alcohols. The alcohols themselves may also serve as cross-linkers, end-cappers, and combinations thereof, depending on the number of hydroxyl groups provided by each. In certain embodiments, the composition can include one or more alcohols in addition to, and different from, the first and second alcohols.

By "organic", it is generally meant that each of the alcohols contain predominantly carbon, e.g. a carbon backbone. While carbon is present, other atoms may also be present, such as oxygen atoms, hydrogen atoms, nitrogen atoms, etc. In many embodiments, each of the alcohols is free of silicon, e.g. one or more silicon atoms. The alcohols can each independently be selected from the group consisting of organic monols having one hydroxyl group, polyols having two or more hydroxyl groups (e.g. diols, triols, tetrols, etc.), and combinations thereof. Examples of suitable monols include, but are not limited to, monols described as capping components below.

In various embodiments, at least one, or both, of the alcohols is a diol (i.e., an alcohol having two hydroxyl groups). Examples of suitable diols include, but are not limited to, methylene glycol, ethylene glycol, diethylene glycol, propylene glycol, dipropylene glycol, butane diol, bisphenol A, 1,4-butanediol, 1,3-propanediol, 1,5-pentanediol, 1,7-heptanediol, 1,2-hexanediol, triethylene glycol, tripropylene glycol neopentyl glycol, and combinations thereof. In other embodiments, at least one, or both, of the alcohols is a triol (i.e., an alcohol having three hydroxyl groups). Polyols of higher functionality may also be utilized.

In certain embodiments, at least one, or both, of the alcohols has the following general formula HO—$R^8$—OH. In these embodiments, $R^8$ is selected from alkyl, cycloalkyl, alkyl cycloalkyl, aromatic, and alkylaromatic diradicals. Such diradicals generally have up to 50, up to 40, up to 30, up to 20, or up to 10, carbon atoms, or any number of carbon atoms between 1 and 50. The carbon chain which makes up the backbone of the alcohol may be straight chained or branched. In certain embodiments, the alcohol may have ether, thin, or amine linkages in its main chain. In specific embodiments, $R^8$ is a hydrocarbylene group having from 1 to 40, 1 to 30, 1 to 20, or 1 to 10 carbon atoms, or any number of carbon atoms in between.

In certain embodiments, at least one, or both, of the alcohols is a (poly)oxyalkylene compound. Suitable examples of such compounds include, but are not limited to, ethylene glycol, diethylene glycol, triethylene glycol, polyethylene glycol (e.g. having a molecular weight of 200 to 2,000), propylene glycol, dipropylene glycol, polypropylene glycol (e.g. having a molecular weight of 200 to 3,000), butylene glycol, dibutylene glycol, polybutylene glycol (e.g. having a molecular weight of 200 to 4,000), random copolymers and block copolymers of polyethylenepropylene glycol (e.g. having a molecular weight of 100 to 3,000), random copolymers and block copolymers of polyethylenebutylene glycol (e.g. having a molecular weight of 100 to 4,000), and combinations thereof.

In various embodiments, at least one, or both, of the alcohols can comprise a polyester polyol, a polyether polyol, a polyether/ester polyol, or combinations thereof. Furthermore, at least one, or both, of the alcohols may be selected from aliphatic polyols, cycloaliphatic polyols, aromatic polyols, heterocyclic polyols, and combinations thereof. Some examples of suitable polyols include, but are not limited to, glycol-initiated polyols, glycerine-initiated polyols, sucrose-initiated polyols, sucrose/glycerine-initiated polyols, trimethylolpropane-initiated polyols, and combinations thereof.

Suitable polyester polyols include hydroxyl-terminated reaction products of polyhydric alcohols, polyester polyols obtained by the polymerization of lactones, e.g. caprolactone, in conjunction with a polyol, and polyester polyols obtained by the polymerization of hydroxy carboxylic acids, e.g. hydroxy caproic acid. Polyesteramide polyols, polythioether polyols, polycarbonate polyols, polyacetal polyols, and polyolefin polyols may also be used.

Suitable polyether polyols include products obtained by the polymerization of a cyclic oxide, such as ethylene oxide (EO), propylene oxide (PO), butylene oxide (BO), and tetrahydrofuran in the presence of a polyfunctional initiator. Suitable initiator compounds contain a plurality of active hydrogen atoms, and include, but are not limited to, water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof. Some of these initiators may also be useful as the polyol itself. In specific embodiments, at least one, or both, of the alcohols is a polyether diol. Combinations of different alcohols can be utilized to form the composition.

Fourth Embodiment

In various embodiments, at least one, or each, of the amines has one, alternatively two, amine groups. In other embodiments, at least one, or each, of the amines has three or more amine groups. Each of the amine groups can be pendant or terminal. Pendant groups may also be referred to as side groups, and are different from terminal groups sometimes referred to as end groups. In certain embodiments, each of the amines has pendant amine group(s) and is free of terminal amine groups. Each of the amine groups can be directly bonded to a carbon atom, or to an intervening atom or linkage that is directly bonded to a carbon atom. Each of the amine groups can be primary or secondary, typically primary. The amine groups are useful for reaction with the siloxane, and can also impart additional functionality to the composition. Typically, all of the amine groups of the amines cross-link with anhydride groups of the siloxane to form linkages. Some amount of anhydride and/or carboxyl groups can remain free depending on the amount of amine groups present during reaction to form the composition. Such free groups can be useful for subsequent reaction(s) and/or can also interact with substrate surfaces, e.g. skin, leather, etc.

The amines can each be any type of amine provided they have at least one amine group reactive with the terminal anhydride groups of the siloxane. Optionally, other functional groups may also be present, e.g. hydroxyl groups. In this way, the siloxane serves as a cross-linker between the amines to thereby form the composition. The composition may constitute just one molecule of the siloxane, or a plurality of molecules of the siloxane depending, for example, on the number of amine groups attributable to the amines. The amines themselves may also serve as cross-linkers, end-cappers, and combinations thereof, depending on the number of amine groups provided by each. In certain embodiments, the composition can include one or more amines in addition to, and different from, the first and second amines.

By "organic", it is generally meant that each of the amines contain predominantly carbon, e.g. a carbon backbone. While carbon is present, other atoms may also be present, such as oxygen atoms, hydrogen atoms, nitrogen atoms, etc. In many embodiments, each of the amines is free of silicon, e.g. one or more silicon atoms. The amines can each independently be selected from the group consisting of organic monoamines having one amine group, polyamines having two or more amine groups (e.g. diamines, triamines, tetramines, etc.), and combinations thereof. Examples of suitable monoamines include, but are not limited to, monoamines described as capping components below.

In various embodiments, at least one, or both, of the amines is a diamine (i.e., an amine having two amine groups). Examples of suitable diamines include, but are not limited to, ethylenediamine, toluene diamine, 1,3-diaminopropane, putrescine, cadaverine, hexamethylenediamine, 1,2-diaminopropane, diphenylethylenediamine, diaminocyclohexane, xylylenediamines, phenylenediamine, benzidine, spermidine, spermine, aminobenzylamines, and combinations thereof. In other embodiments, at least one, or both, of the amines is a triamine (i.e., an amine having three amine groups). Polyamines of higher functionality may also be utilized. In specific embodiments, at least one, or both, of the amines is a polyether diamine.

In certain embodiments, at least one, or both, of the amines has the following general formula $R_2N—R^8—NR_2$. In these embodiments, $R^8$ is selected from alkyl, cycloalkyl, alkyl cycloalkyl, aromatic, and alkylaromatic diradicals. Such diradicals generally have up to 50, up to 40, up to 30, up to 20, or up to 10, carbon atoms, or any number of carbon atoms between 1 and 50. The carbon chain which makes up the backbone of the amine may be straight chained or branched. In certain embodiments, the amine may have ether, thio, or amine linkages in its main chain. In specific embodiments, $R^8$ is a hydrocarbylene group having from 1 to 40, 1 to 30, 1 to 20, or 1 to 10 carbon atoms, or any number of carbon atoms in between. Each R is independently a hydrogen atom (H) or $R^1$; typically each R is an H.

In certain embodiments, the polyamine is a (poly)oxyalkylene compound. Suitable examples of such compounds include, but are not limited to, ethylene diamine, diethylene diamine, polyethylene diamine (e.g. having a molecular weight of 200 to 2,000), propylene diamine, dipropylene diamine, polypropylene diamine (e.g. having a molecular weight of 200 to 3,000), butylene diamine, dibutylene diamine, polybutylene diamine (e.g. having a molecular weight of 200 to 4,000), and combinations thereof.

In various embodiments, at least one, or both, of the amines can comprise a polyester polyamine, a polyether polyamine, a polyether/ester polyamine, or combinations thereof. Furthermore, at least one, or both, of the amines may be selected from aliphatic polyamines, cycloaliphatic polyamines, aromatic polyamines, heterocyclic polyamines, and combinations thereof. Some examples of suitable polyamines include, but are not limited to, glycol-initiated polyamines, glycerine-initiated polyamines, sucrose-initiated polyamines, sucrose/glycerine-initiated polyamines, trimethylolpropane-initiated polyamines, and combinations thereof.

Further examples of suitable polyamines include, but are not limited to, divalent and higher polyvalent primary or secondary, aliphatic, araliphatic, cycloaliphatic or aromatic amines. Specific examples include among others, 4-aminobenzylamines, 4,4'-diaminodicyclohexylmethane, phenylene diamines, etc. Polyamines such as diethylenetriamine, triethylenetetramine, diethylenepropylamine, N-(2-hydroxyethyl)diethylenetriamine, N,N'-di(2-hydroxyethyl)diethylenetriamine, m-phenylenediamine, methylenedianiline, aminoethyl piperazine, 4,4-diaminodiphenyl sulfone, benzyldimethylamine, dicyandiamide, and 2-methylimidazole, and triethylamine, can also be utilized.

Suitable aromatic diamines such as a diaminodiphenylsulfone, a methylenedianiline such as 4,4'-methylenedianiline, a diaminodiphenylether, benzidine, 4,4'-thiodianiline, 4-methoxy-6-m-phenylenediamine, 2,6-diaminopyridine, 2,4-toluenediamine, and dianisidine can be utilized. Further examples include alicyclic amines, such as menthane diamine and heterocyclic amines such as pyridine. In some cases, aliphatic amines such as secondary alkylamines can be utilized.

Further suitable diamines include, but are not limited to, the isomeric phenylene diamines, 4,4'-diaminobenzophenone, bis(4-amino)diphenyl ether and 2,2-bis(4-aminophenyl)propane. Other examples of suitable amines include alcohol amines, such as ethanol amine and diethanol amine, as well as amino acids and peptides.

Further examples of suitable polyamines include, but are not limited to, m-phenylenediamine, p-phenylenediamine, 4,4'-diaminodiphenyl ether, 3,4'-diaminodiphenyl ether, 4,4'-diaminodiphenylsulfone, 3,3'-diaminodiphenylsulfone, 2,2'-ditrifluoromethyl-4,4'-diaminobiphenyl, 9,9-bis(4-aminophenyl)fluorene, 9,9-bis(4-mino-3-methylphenyl)fluorene, bis[4-(4-aminophenoxy)phenyl]sulfone, bis[4-(3-aminophenoxy)phenyl]sulfone, 2,2-bis[4-(4-aminophenoxy)phenyl]propane, 3-(methylamino)propylamine, and 2,2-bis(4-aminophenyl)hexafluoropropane. Other examples include alkyl amines, propyl amine, isobutyl amine, alkyleneoxide amines, EO amines, PO amines, BO amines, etc. Combinations of different amines can be utilized to form the composition.

In certain embodiments, a non-functionalized resin (i.e., one lacking reactive functional groups) is utilized in the composition. In these embodiments, the non-functionalized resin is trapped within the polymeric network during cure of the composition. Such non-functionalized resins can be useful for providing chemical and/or physical modifications to the composition. Various embodiments of the composition will now be described.

In the first and second embodiments, the composition is generally of the following general formula (I):

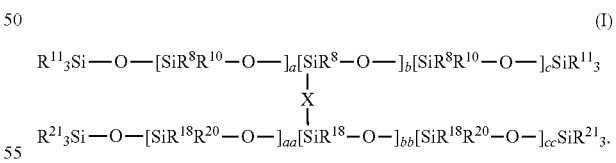

In formula (I), the upper and lower portions are attributable to the first and second siloxanes. The first and second siloxanes can be the same or different. $R^{18}$ can be the same as or different from $R^8$, $R^{20}$ can be as the same or different from $R^{10}$, and $R^{21}$ can be the same as or different from $R^{11}$. Typically, each $R^{11}$ is $R^8$, and/or each $R^{21}$ is $R^{18}$. Further, aa can be the same as or different from a, bb can be the same as or different from b, and cc can be the same as or different from c. The groups represented by subscripts a, aa, b, bb, c, and cc, i.e., the groups having square brackets in formula (I), may be present in any order within the composition, including a different order than that which is represented above and throughout this disclosure. Moreover, these groups may be present in randomized or block form.

Each of $R^3$, $R^8$, $R^{10}$, and $R^{11}$ are as like described with the siloxanes. Each of a, b, and c are also as like described with the siloxanes. Each of $R^{18}$, $R^{20}$, and $R^{21}$ can be an independently selected substituted or unsubstituted hydrocarbyl group. Examples of suitable groups for $R^{18}$, $R^{20}$, and $R^{21}$ are as described for $R^8$, $R^{10}$, and $R^{11}$.

In certain embodiments, $R^{18}$ is an independently selected alkyl group. Suitable alkyl groups can be linear, branched, or cyclic. If present as $R^{18}$, the alkyl group generally has from 1 to 20, 1 to 15, 1 to 10, 1 to 6, 1 to 4, or 1 to 2, carbon atoms, or any number of carbon atoms in between. Specific examples of suitable alkyl groups as $R^{18}$ include methyl groups, ethyl groups, propyl groups, butyl groups, pentyl groups, etc. Typically, $R^{18}$ is a methyl group.

In certain embodiments, each $R^{20}$ is an independently selected alkyl group, aryl group, or $(R^{16}O)_{mm}$ group. In specific embodiments, $R^{20}$ is an independently selected alkyl group having from 2 to 20, 2 to 15, 2 to 10, 2 to 5, or 2, carbon atoms, or any number of carbon atoms in between. In alternate embodiments, $R^{20}$ may be silicone side chain of the siloxane. Typically, $R^{20}$ is either an alkyl group or a polyether group.

Typically, aa is an integer selected from 0 to 1,000, 0 to 950, 0 to 750, 0 to 500, 0 to 400, 0 to 300, 0 to 200, 0 to 100, 0 to 75, 0 to 50, 0 to 25, 0 to 20, or 0 to 15, or any number in between. Typically bb is an integer selected from 1 to 1,000, 1 to 950, 1 to 750, 1 to 500, 1 to 400, 1 to 300, or 1 to 200, or any number in between. Typically cc is an integer selected from 0 to 1,000, 0 to 950, 0 to 750, 0 to 500, 0 to 400, 0 to 300, 0 to 200, 0 to 100, 0 to 75, 0 to 50, 0 to 25, 0 to 20, or 0 to 15, or any number in between.

The middle (or X) portion of formula (I) is attributable to the third siloxane, as well as the functional groups of the (first and second) siloxanes. Specifically, each X is generally of the following general formula (i):

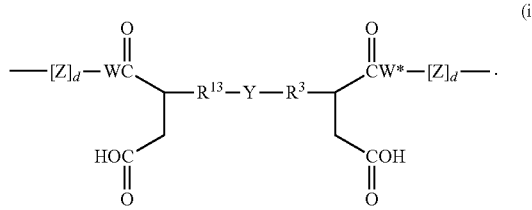

(i)

In formula (i), each of W and W* is attributable to the siloxanes. Typically, each of W and W* is independently an oxygen atom (O) or N—R, with R independently being a hydrogen atom (H) or $R^1$; typically R is an H. Each of Z and d is as described above with the siloxanes. In the first embodiment, each of W and W* is independently an O. In the second embodiment, each of W and W* is independently N—R.

Each Y is a divalent group, which is attributable to the third siloxane. During formation of the composition, the siloxanes had functional groups, e.g. pendant hydroxyl groups or pendent amine groups, which reacted with terminal anhydride groups of the third siloxane to form linkages between the siloxanes. As also shown in formula (i), the composition has two carboxyl groups. The possibility of such carboxyl groups is described below. In other embodiments (not shown), two molecules of the first/second siloxane has reacted with the two carboxyl groups to form additional linkages (i.e., the two carboxyl groups in formula (i) are gone). In yet other embodiments (not shown), only one of the two carboxyl groups in formula (i) is gone, i.e., one carboxyl group remains free.

Y can be of any structure attributable to the third siloxane. In various embodiments where the third siloxane is a polysiloxane, Y is of the following general formula (ii):

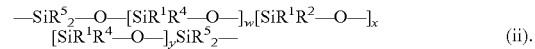

(ii).

Each of $R^1$, $R^2$, $R^4$, and $R^5$ are as like described with the third siloxane. Each of w, x, and y are also as like described with the third siloxane. In other embodiments where the third siloxane is a resin, Y is of the general formula $R^*_sSiO_{(4-s)/2}$. $R^*$ and s are as like described with the siloxanes. In certain embodiments where the third siloxane is free of polyether groups, Y is also free of polyether groups.

In formula (i), $R^{13}$ is a divalent group. Various types of divalent groups are suitable as $R^{13}$. Typically, $R^{13}$ is a hydrocarbylene, heterohydrocarbylene, or organoheterylene group. In various embodiments, $R^{13}$ is $(CH_2)_{nn}$ where nn is an integer selected from 1 to 30, 1 to 25, 1 to 20, 1 to 15, 1 to 10, 1 to 5, or 1 to 3, or any number in between. Typically, nn is 3. $R^{13}$ can be the same as or different from $R^3$.

In the third and fourth embodiments, the composition is generally of the following general formula (II):

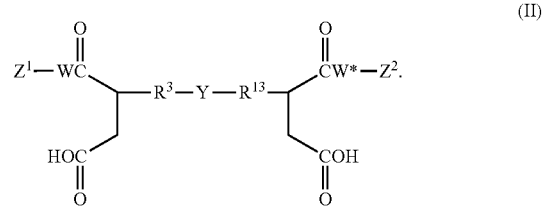

(II)

In formula (II), the leftmost and rightmost portions are attributable to the alcohols and/or amines. The middle portion of formula (II) is attributable to the siloxane, as well as the functional groups of the alcohols and/or amines. $R^3$ and $R^{13}$ are as described above.

Typically, each of W and W* is independently an O or N—R, with R independently being an H or $R^1$; typically R is an H. In the third embodiment, each of W and W* is independently an O. In the fourth embodiment, each of W and W* is independently N—R. Z and d are as described above. Y can be of any structure attributable to the siloxane. In various embodiments where the siloxane is a polysiloxane, Y is of the general formula (ii) described above.

Each of $Z^1$ and $Z^2$ ("Z") is independently attributable to one of the alcohols or amines. The alcohols can be the same or different. The amines can also be the same or different. In certain embodiments, one or both of Z comprises at least one structural unit selected from the group consisting of: $[(CH_2)_i]_k$; $[(CH_2)_jO]_k$; $[(CH_2)_i(CH)(CH_3)O]_k$; $[(CH_2)_i(CH)(CH_2)_j(CH_3)O]_k$; $[(CH)OH]_k$; $[(CH)(CH_2)_iOH]_k$; $[(CH_3)_2COH(CH_2)_i]_k$; $[(CH_3)(CH_2)_iCOH(CH_2)_j(CH_3)]_k$; $[(CH_2)_iNH(CH_2)_i]_k$; $[(CH_2)_iN(CH_2)_j(CH_3)]_k$; and combinations thereof. In various embodiments, i is an integer selected from 1 to 100, 1 to 75, 1 to 50, 1 to 25, 1 to 10, 1 to 5, or 1, or any number in between; j is an integer selected from 1 to 100, 1 to 75, 1 to 50, 1 to 25, 1 to 10, 1 to 5, or 1, or any number in between; and k is an integer selected from 1 to 100, 1 to 75, 1 to 50, 1 to 25, 1 to 10, 1 to 5, or 1, or any number in between.

Examples of one or both of Z include structure units (or moieties) attributable to use of one or more of the alcohols and/or amines above. Specific examples of one or both of Z include structure units (or moieties) attributable to use of 4-penten-1-ol, 7-octen-1-ol, glycerol monoallyl ether, allyl xylitol, trimethylolpropane monoallyl ether, xylitol, pentaerythritol, triglycerol, 1,8-diaminooctane, poly(ethylene glycol) diamine, 1,5 diamino-2-methylpentane, and combinations thereof. In certain embodiments, Z can include one or more pendant functional (e.g. hydroxyl and/or amine) groups in addition to the (former) hydroxyl group and/or (former) amine group illustrated in formula (II).

Each Y is a divalent group, which is attributable to the siloxane. During formation of the composition in the third embodiment, the alcohols had hydroxyl groups which reacted with terminal anhydride groups of the siloxane to form linkages between the siloxane and alcohols. During formation of the composition in the fourth embodiment, the amines had amine groups which reacted with terminal anhydride groups of the siloxane to form linkages between the siloxane and amines. As also shown in formula (II), the composition has two carboxyl groups. The possibility of such carboxyl groups is described below. In other embodiments (not shown), two molecules of the alcohols and/or amines has reacted with the two carboxyl groups to form additional linkages (i.e., the two carboxyl groups in formula (II) are gone). In yet other embodiments (not shown), only one of the two carboxyl groups in formula (II) is gone, i.e., one carboxyl group remains free.

In certain embodiments, the composition can be formed with a supplemental cross-linker in addition, and/or alternate to, the siloxane. Examples of suitable supplemental cross-linkers include polyols, polyamines, polyepoxides, and combinations thereof. Suitable supplemental cross-linkers, as well as other optional components that can be used to form, and/or be used in combination with the composition, are described in U.S. Pat. No. 5,444,139 to Valpey, III et al. and U.S. Pat. No. 8,026,330 to Kamei; and US Pat. App. Pub. No. 2012/0040931 to Kamei; which are incorporated herein by reference.

Further suitable supplemental cross-linkers and siloxanes that can be used to form, and/or be used in combination with the composition, are described in U.S. Provisional Patent Application Nos. 61/898,022, 61/898,027, 61/898,029, and 61/898,033, which are incorporated herein by reference. Combinations of cross-linkers, supplemental cross-linkers, (functional and/or non-functional) resins, and/or siloxanes, can be utilized.

The method comprises the steps of providing the first reactant, providing the second reactant, and providing the siloxane. The method further comprises the step of combining the first reactant, second reactant, and siloxane (each described above) to form the composition.

In various embodiments, the composition can be prepared by:

(1) subjecting an organohydrogensiloxane having hydrogen atoms at the site(s) where $R^7$ is to be bonded and an acid anhydride compound to an addition reaction to form the siloxane; and (2) subjecting the siloxane obtained in the step (1) to a ring-opening reaction by combining it with the reactants thereby forming the composition.

Suitable examples of the acid anhydride compound include, but are not limited to, succinic acid anhydride and derivatives thereof, such as vinyl succinic acid anhydride, allyl succinic acid anhydride, allyl-2-methylsuccinic acid anhydride, allyl-2,3-dimethyl succinic acid anhydride, and allyl-2-ethyl succinic acid anhydride. In various embodiments, allyl succinic anhydride (ASA) is used.

Optionally, in embodiments where the siloxane has side chains as one or more of the $R^4$ groups, step (1) can also include providing at least one component that is reactive with hydrogen atoms at the site(s) where $R^4$ is to be bonded. Various types of components can be utilized to provide $R^4$. Typically, the component will have an unsaturated bond. Examples of suitable components include alkenes, such as those having from 2 to 20 carbon atoms; aldehydes; ketones; and combinations thereof. Specific examples of suitable alkenes include, but are not limited to, ethene, propene, 1-Butene, 1-Pentene, 1-Hexene, 1-Hexadecene, and combinations thereof. Components that impart a polyether group can be used. Vinyl terminated siloxanes may also be used as the component. Combinations of different components can be utilized to impart the $R^4$ groups. If utilized, the component can be introduced prior to, after, or simultaneously with, the acid anhydride compound. The amount of each can be tailored to impart the composition with various levels of each of the $R^7$ and $R^4$ groups. $R^4$ may already be present on the organohydrogensiloxane such that this optional step is not required.

The addition reaction in step (1) may also be referred to as a hydrosilylation reaction. The addition reaction in step (1) may be performed in the presence of catalyst, such as a platinum catalyst or a rhodium catalyst. Examples of suitable catalysts include, but are not limited to, chloroplatinic acid, chloroplatinic acid modified with an alcohol, and a complex of chloroplatinic acid with a vinylsiloxane. An amount of the catalyst to be used may be a catalytically effective amount, i.e., a catalytic amount, which is usually at most 50 ppm, particularly at most 20 ppm, as platinum metal or rhodium metal.

The addition reaction in step (1) may be performed in a solvent as needed. Various types of conventional solvents can be utilized, such as silicone solvents and/or organic solvents. A specific example of a suitable silicone solvent is 3-octylheptamethyltrisiloxane. Examples of suitable organic solvents include, but are not limited to, aromatic hydrocarbons such as toluene and xylene; aliphatic or alicyclic hydrocarbons such as n-pentane, n-hexane, and cyclohexane; and halogenated hydrocarbons such as dichloromethane, chloroform, and carbon tetrachloride. Additional examples of suitable solvents are described as "carrier fluids" in U.S. Pat. App. Pub. No. 2010/0330011 (to Kennan et al.), which is incorporated herein by reference.

Reaction conditions for the addition reaction in step (1) are not limited to any particular ones. In certain embodiments, the addition reaction is performed under reflux for 1 to 10 hours. While step (1) is described above, the siloxane may also be provided "as is", i.e., it need not be first formed via such an addition reaction step. Suitable siloxanes are available from Dow Corning Corporation of Midland, Mich. Suitable reactants (e.g. functional siloxanes, alcohols, and amines) are available from a variety of sources including Dow Corning Corporation.

Optionally, rather than just cross-linking the anhydride groups of the siloxane in step (2), one or more of the functional groups provided by the opened anhydride groups may be capped. Various types of capping components can be utilized. Typically, the capping component will have at least one functional group, e.g. a hydroxyl group, an amine group, etc. Examples of suitable capping components include branched and unbranched aliphatic, cycloaliphatic, and aromatic monols and/or monoamines. Various types of capping components can be utilized, such as those having from 1 to 20 carbon atoms. Specific examples of suitable monols include, but are not limited to, methanol, ethanol, propanol, isopropanol, butanol, sec-butanol, isobutanol, tert-butanol, and the various isomers of pentyl alcohol, hexyl alcohol, octyl alcohol (e.g. 2-ethylhexanol), nonyl alcohol, decyl alcohol (e.g. 2-propylheptanol), lauryl alcohol, myristyl alcohol, cetyl alcohol and of stearyl alcohol, as well as the fatty alcohols and wax alcohols which occur naturally or which can be obtained by the hydrogenation of naturally occurring carboxylic acids. Cyclohexanol and its homologues are examples of suitable cycloaliphatic alcohols.

Further, aromatic hydroxyl compounds, such as phenol, cresol, thymol, carvacrol, benzyl alcohol and phenylethanol, can also be utilized. In certain embodiments, the capping component is selected from the group of aliphatic alcohols, such as methanol, ethanol, 2-propanol, butanol, and isododecane. Combinations of different capping components can be used. If utilized, the capping component can be introduced prior to, after, or simultaneously with, the reactants. The amount of each can be tailored to impart the composition with various levels of cross-linking, capping, free anhydride groups, and/or free carboxyl groups. Capping is optional.

The ring-opening reaction in the step (2) may be performed in a solvent as needed. Examples of suitable solvents include those listed for step (1). To prevent undesirable side-reactions/reaction-products, the solvent should be inert with respect to the reactants/reaction-intermediates. For example, the solvent shouldn't have hydroxyl or amine functional groups. This is generally true for steps (1) and (2). The reaction conditions for the ring-opening reaction are not limited to any particular ones. In certain embodiments, the ring-opening reaction is performed at a temperature of from room temperature to a reflux temperature for 1 to 10 hours.

The reactants and siloxane can be reacted in various amounts to form the composition. Based on the number of functional groups provided by the reactants, relative to the number of anhydride groups provided by the siloxane, the reactants can be utilized in a 1:1 stoichiometric ratio. For example, one hydroxyl group or amine group can be present for every one of the anhydride groups present. Alternatively, the siloxane can be utilized in a stoichiometric excess relative to the reactants. Conversely, the reactants can be utilized in a stoichiometric excess relative to the siloxane. Such situations may also be referred to as over-indexing or under-indexing the ring-opening reaction, with an index of 1.0 (or 100) indicating that there is a stoichiometric amount of hydroxyl groups or amine groups present to react with the amount of anhydride groups present (1:1). The index may be from 0.25 to 2.0, 0.5 to 1.5, 0.9 to 1.1, 0.95 to 1.05, or 1.0, or any number in between. Higher or lower indexes may also be utilized.

Based on the particular index utilized, various situations can arise. Specifically, the composition can include various functional groups, including free carboxyl groups, and possibly even free anhydride groups and/or free hydroxyl groups and/or free amine groups, or combinations thereof. In many embodiments, the composition does not include free hydroxyl groups and/or free amine groups. In certain embodiments, the composition has a least two carboxyl groups. The disclosure is not limited to any particular subsequent reaction or use of such free functional groups. Various degrees of cross-linking can be present in the composition based on the index utilized to form the composition, from various degrees of partial cross-linking to full cross-linking.

In certain embodiments having free carboxyl groups after the ring-opening reaction, the composition has a carboxyl equivalent of from 100 to 50,000, 500 to 10,000, or 500 to 5,000, g/mol. For good handling property, the composition can have a viscosity of from 10 to 1,000,000 or 10 to 100,000, mm$^2$/sec.

The composition is useful for a variety of end applications, and is not limited to any particular one. Examples of suitable applications include use in personal care, household care, and beauty care products. Textile and coating applications are also contemplated. In embodiments having free carboxyl groups, the composition can also be used for modifying organic resins or fibers and surface-treating powder. The treated surface shows high affinity with an unctuous agent. Particularly, dispersivity of powder is significantly improved. Therefore, the composition can be useful for applications where high dispersivity of a powder is required, for example, cosmetics such as skincare and makeup products, and coatings. The composition can also be used to enhance the aesthetics of personal care formulations for skin care and healthcare by providing a unique sensory profile upon application. The composition can provide sensory characteristics such as a velvety, silky or powdery feel. In addition, the composition can be used for providing rheology modification to personal care (skin, sun, cosmetic) and healthcare formulations. The composition also has excellent formulation versatility. Without being bound or limited to any particular theory, it is thought that potential benefits provided by, or attributable to, the composition include, but are not limited to, one or more of the following: film forming, substantivity (i.e., longer lasting), durability, pigment/particle suspension and/or modification, long lasting/wear, additional chemistry, actives (e.g. drug) or inactives (e.g. fragrance) delivery/release, and combinations thereof.

The composition can also have excellent tactile aesthetic and/or rheological properties. For example, the composition can have a dry, velvety feel, which is unmatched by conventional silicone products. The composition can better anchor to skin relative to conventional products. The composition can also have excellent water uptake and/or excellent compatibility with organic solvents, such as those used in personal care applications. In various embodiments, the composition has excellent hydrophilicity, which is useful for water based or water containing formulations. Therefore, harsh or volatile carriers are unnecessary.

The following examples, illustrating the composition and method of the disclosure, are intended to illustrate and not to limit the invention. Embodiments of the disclosure utilizing different reactants are also described below.

First Embodiment

Various examples of the first, second, and third siloxanes are prepared via an addition reaction scheme. These examples are described in Examples 1 through 4 below.

Example 1: Allyl Succinic Anhydride Functional (ASA) Siloxane

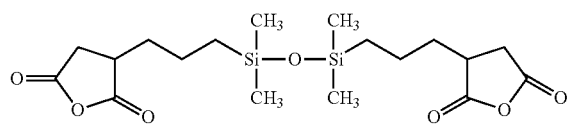 [SMILES: C[Si](C)(CCCC1CC(=O)OC1=O)O[Si](C)(C)CCCC1CC(=O)OC1=O]

To a 250 ml three neck round bottom flask equipped with glass stir rod, Teflon® moon shaped paddle, stir bearing, temperature probe, heating mantle, and nitrogen sweep, is placed 55.0 grams of ASA ($C_7H_8O_3$). To a 125 ml addition funnel attached to the flask, is placed 45.0 grams of tetramethyldisiloxane. The contents of the reaction flask are heated to 60° C. The tetramethyldisiloxane is added to the reaction flask dropwise and the reaction is catalyzed with 0.1 gram of 1,3-diethenyl-1,1,3,3-Tetramethyldisiloxane complexed with platinum. Additional catalyst is added as needed until no Si—H groups remain. After completion of the reaction, the reaction product is stripped, cooled, and decanted. The ASA siloxane may be referred to as an ASA dimer.

Example 2: Alcohol or Carbinol Functional Siloxane

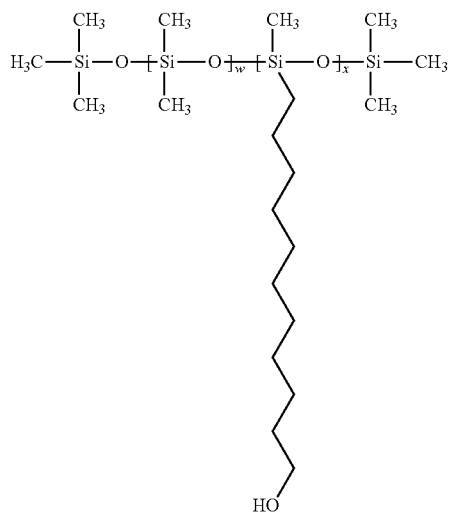

To a 1,000 ml three neck round bottom flask equipped with glass stir rod, Teflon® moon shaped paddle, stir bearing, temperature probe, heating mantle, and nitrogen sweep, is placed 427.21 grams of trimethylsilyl endblocked, dimethyl, methylhydrogen siloxane ($MD_{93}D^H{}_6M$), 3.64 grams of undecylenyl alcohol ($C_{11}H_{22}O_3$), and 55.58 grams of isopropanol (solvent). The contents of the reaction flask are heated to 65° C. and catalyzed with 5 ppm platinum IV. The addition reaction exotherms. An additional 69.19 grams of undecylenyl alcohol is metered to the reaction flask to keep the reaction temperature at ~80° C. After metering is complete, the reaction flask is held at 80° C. for two hours. The reaction product is batch stripped at 120° C. and 0.1 mm Hg to remove volatiles.

Example 3: Alcohol or Carbinol/Alkyl Functional Siloxane

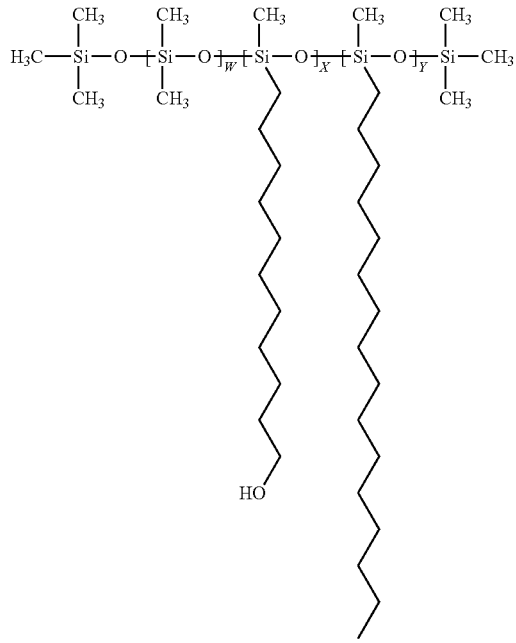

To a 1,000 ml three neck round bottom flask equipped with glass stir rod, Teflon® moon shaped paddle, stir bearing, temperature probe, heating mantle, and nitrogen sweep, is placed 256.42 grams of trimethylsilyl endblocked, dimethyl, methylhydrogen siloxane ($MD_{93}D^H{}_6M$), 1.46 grams of undecylenyl alcohol ($C_{11}H_{22}O_3$), and 33.33 grams of isopropanol (solvent). The contents of the reaction flask are heated to 65° C. and catalyzed with 5 ppm platinum IV. The addition reaction exotherms. An additional 27.73 grams of undecylenyl alcohol is metered to the reaction flask to keep the reaction temperature at ~80° C. After metering is complete, the reaction flask is held at 80° C. for 20 to 30 minutes. Next, 14.39 grams of 1-Hexadecane is added to the reaction flask and allowed to react for 1 hour. The reaction product is batch stripped at 120° C. and 0.1 mm Hg to remove volatiles.

Example 4: Polyether/Alkyl Functional Siloxane

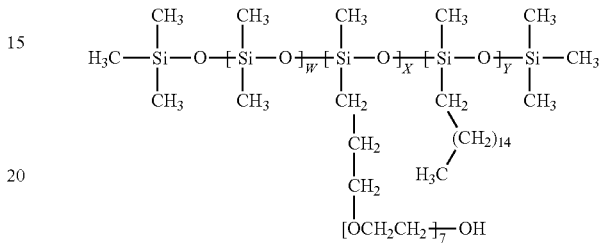

To a 1,000 ml three neck round bottom flask equipped with glass stir rod, Teflon® moon shaped paddle, stir bearing, temperature probe, heating mantle, and nitrogen sweep, is placed 409.11 grams of trimethylsilyl endblocked, dimethyl, methylhydrogen siloxane ($MD_{93}D^H{}_6M$), and 90.89 grams of allyl polyethylene glycol. The contents of the reaction flask are heated to 60° C. and catalyzed with 0.25 grams of 1% solution of platinum complexes in isopropanol. The addition reaction exotherms and the flask is held for one hour at temperature. After ~half of the Si—H groups are reacted, 22.25 grams of 1-Hexadecene is added to finish the reaction. After completion of the reaction, the reaction product is stripped, cooled, and decanted.

Various examples of the composition are prepared via a ring-opening reaction scheme. These examples are described in Examples 5 through 7 below.

Example 5: ASA Dimer and Alcohol or Carbinol Functional Siloxane

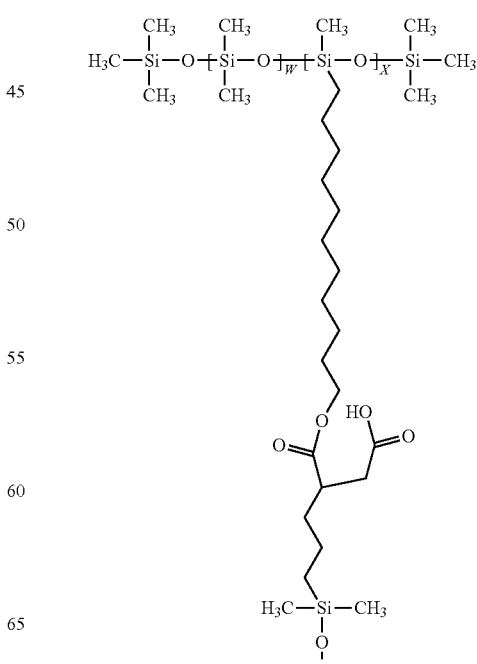

-continued

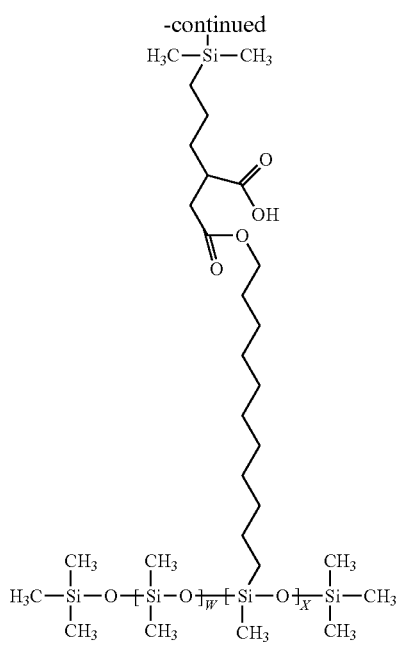

3.18 grams (6 moles) of ASA dimer from Example 1, 21.82 grams (2 moles) of pendant modified undecylenyl alcohol siloxane dimethyl siloxane from Example 2, and 25.0 grams of isododecane (solvent) are added to a 4 oz olive jar equipped with magnetic star shaped stirrer. The olive jar is placed into a water bath at 80° C. The water bath is positioned above a magnetic stirrer hot plate. The magnetic stirrer is set to setting four and the sample begins to gel. After approximately one hour, the reaction gel is allowed to cure at 75° C. for three hours. The sample is then removed from the water bath and allowed cool to room temperature.

Example 6: ASA Dimer and Alcohol or Carbinol/Alkyl Functional Siloxane

-continued

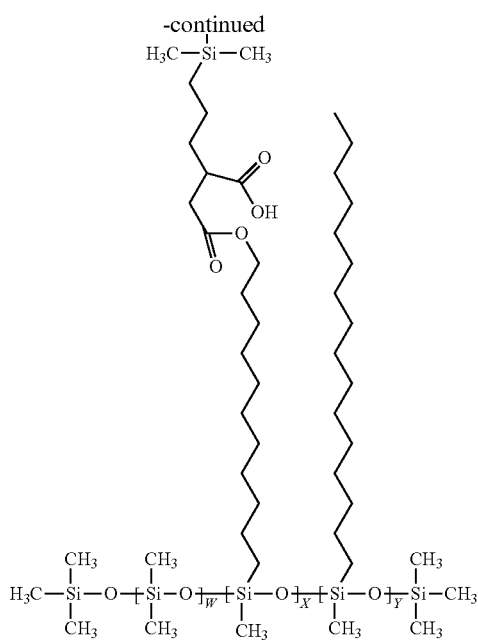

1.92 grams (6 moles) of ASA dimer from Example 1, 13.08 grams (2 moles) of pendant modified undecylenyl alcohol/alkyl siloxane dimethyl siloxane from Example 3, and 15.0 grams of isododecane (solvent) are added to a 4 oz olive jar equipped with magnetic star shaped stirrer. The olive jar is placed into a water bath at 80° C. The water bath is positioned above a magnetic stirrer hot plate. The magnetic stirrer is set to setting four and the sample begins to gel. After approximately one hour, the reaction gel is allowed to cure at 75° C. for three hours. The sample is then removed from the water bath and allowed cool to room temperature.

Example 7: ASA Dimer and Polyether/Alkyl Functional Siloxane

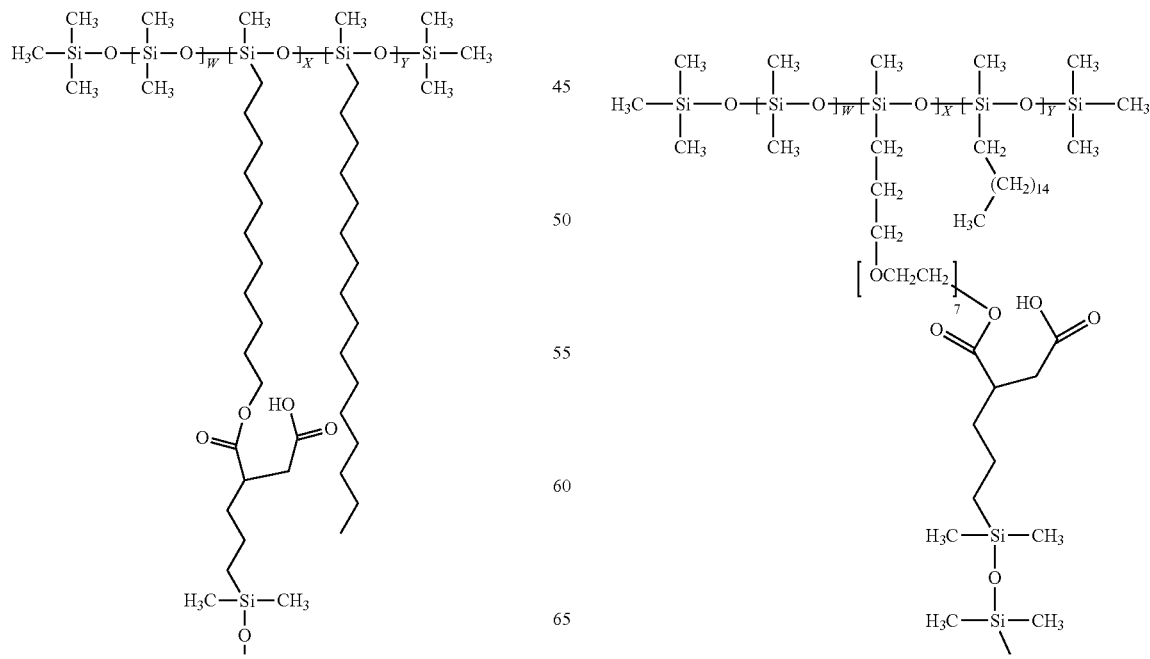

-continued

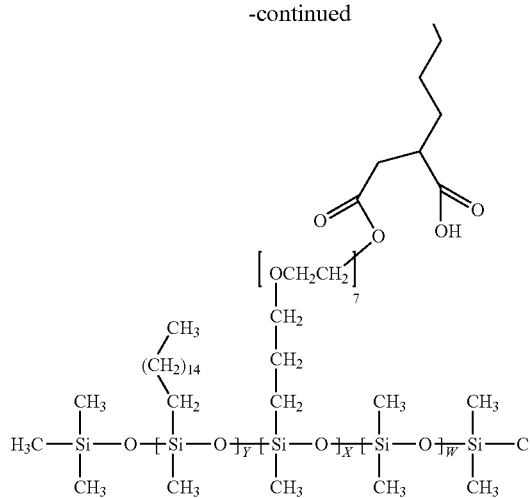

2.44 grams of ASA dimer from Example 1, 27.56 grams of polyethyleneglycol/hexadecane pendant siloxane from Example 4, and 30.0 grams of isododecane (solvent) are added to a 4 oz olive jar equipped with magnetic star shaped stirrer. The olive jar is placed into a water bath at 70° C. The water bath is positioned above a magnetic stirrer hot plate. The magnetic stirrer is set to setting four and the sample begins to gel. After approximately one hour, the reaction gel is placed in an oven at 70° C. for three hours. The sample is then removed from the oven and allowed cool to room temperature.

Second Embodiment

Various examples of the composition are prepared via a ring-opening reaction scheme, as described in Examples 8 through 10 below.

Example 8: ASA Dimer and Aminopropyl Functional Siloxane

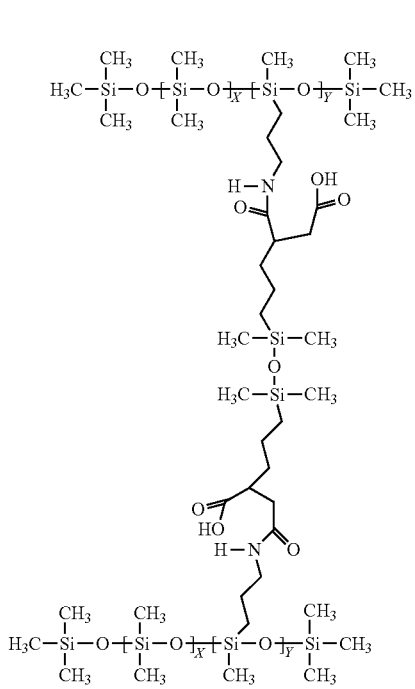

2.05 grams of ASA dimer from Example 1, 12.95 grams of aminopropyl pendant siloxane, and 15.0 grams of isododecane (solvent) are added to a 4 oz olive jar equipped with magnetic star shaped stirrer. The olive jar is placed into a water bath at 70° C. The water bath is positioned above a magnetic stirrer hot plate. The magnetic stirrer is set to setting four and the sample begins to gel. After approximately 30 minutes, the sample is a hard crystalline product.

Example 9: ASA Dimer and Aminoethylaminoisobutyl Siloxane

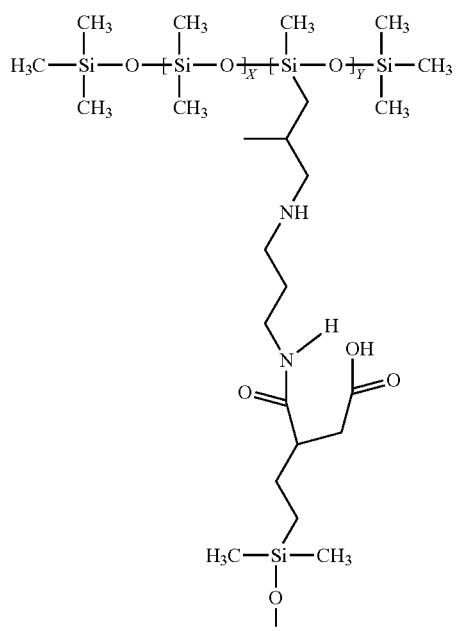

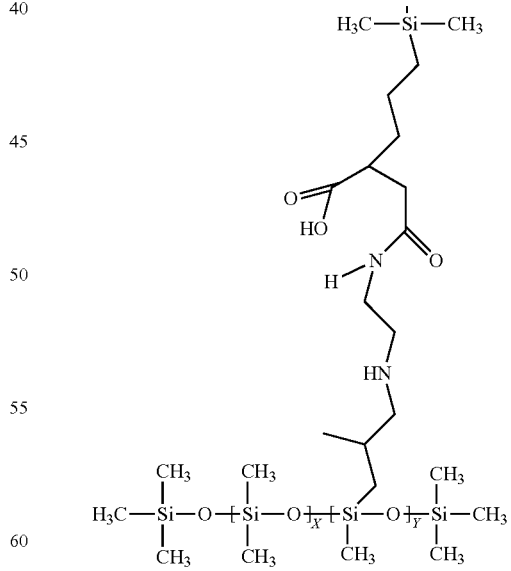

1.28 grams of ASA dimer from Example 1, 23.72 grams of aminoethylaminoisobutyl pendant siloxane, and 25.0grams of isododecane (solvent) are added to a 4 oz olive jar equipped with magnetic star shaped stirrer. The olive jar is placed into a water bath at 70° C. The water bath is positioned above a magnetic stirrer hot plate. The magnetic stirrer is set to setting four and the sample begins to gel. After approximately 30 minutes, the sample is a hard crystalline product.

Example 10: ASA Dimer and Aminoethylaminoisobutyl Siloxane (Different Stoichiometry)

0.36 grams (2 moles) of ASA dimer from Example 1, 7.14 grams (2 moles) of diamine, and 42.5 grams of isododecane (solvent) are added to a 4 oz olive jar equipped with magnetic star shaped stirrer. The olive jar is placed into a water bath at 80° C. The water bath is positioned above a magnetic stirrer hot plate. The magnetic stirrer is set to setting four and the sample begins to stir. Immediately the reaction gels and then the reaction is allowed to cure at 75° C. for three hours. The sample is then removed from the water bath and allowed cool to room temperature.

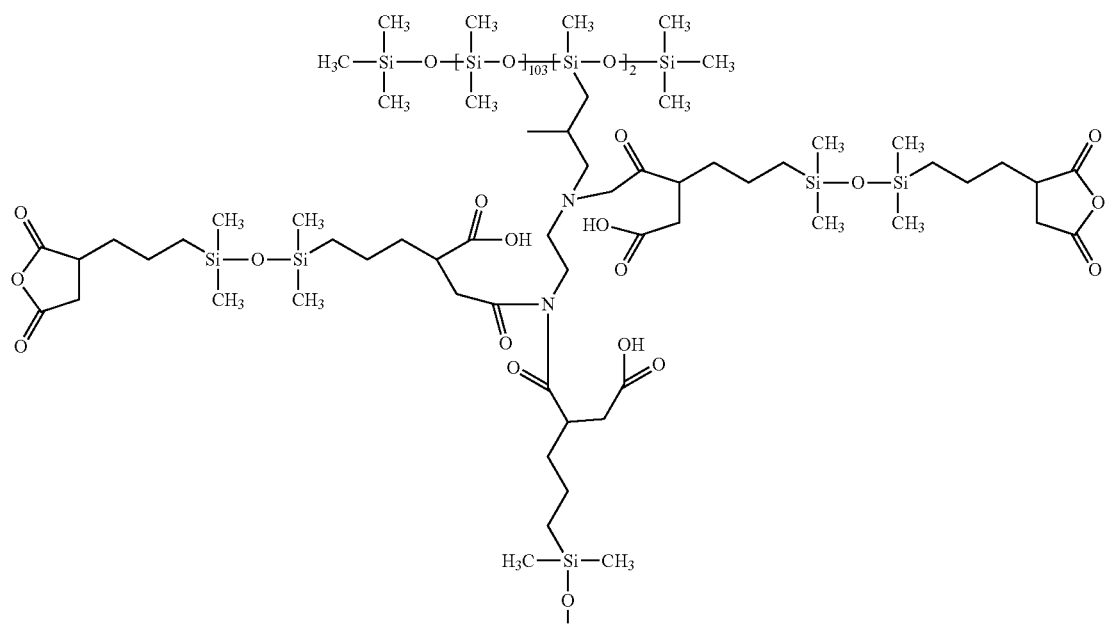

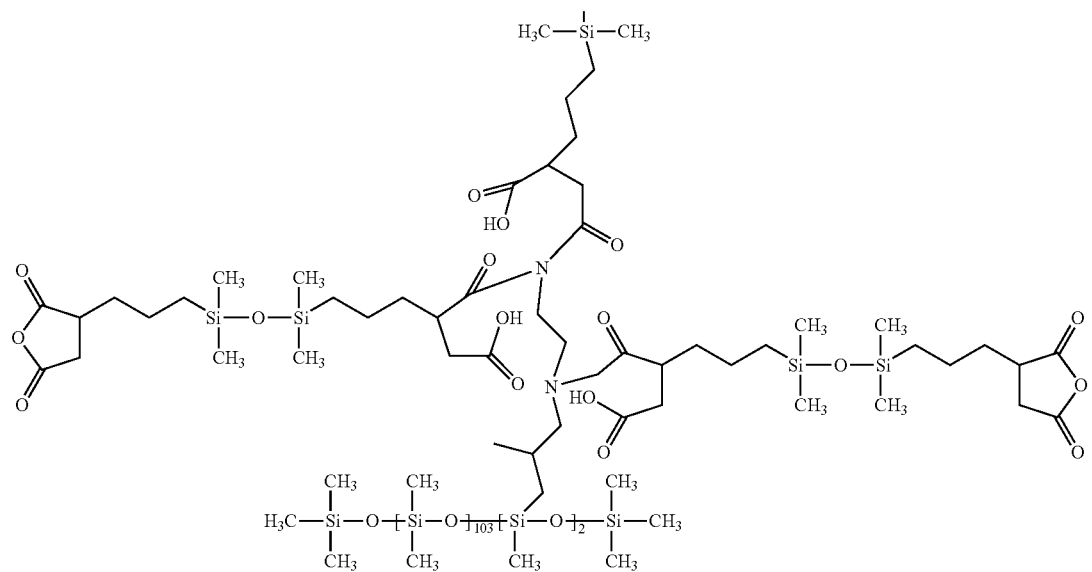

Third Embodiment

An example of the composition is prepared via a ring-opening reaction scheme, as described in Example 11 below.

Example 11: ASA Dimer and Triglycerol

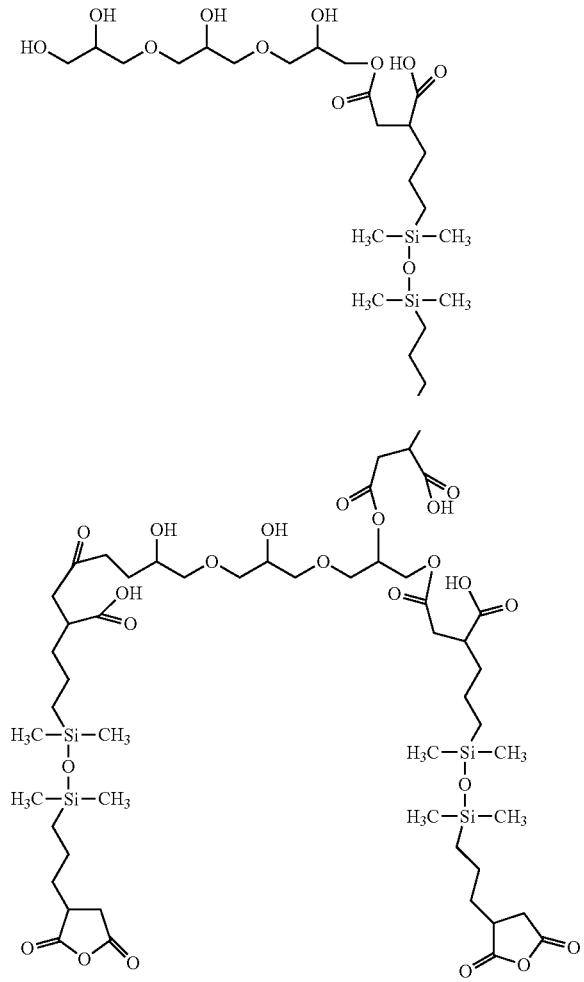

9.68 grams (1 mole) of ASA dimer from Example 1, 2.82 grams (0.5 moles) of triglycerol, and 12.5 grams of isododecane (solvent) are added to a 4 oz olive jar equipped with magnetic star shaped stirrer. The olive jar is placed into a water bath at 80° C. The water bath is positioned above a magnetic stirrer hot plate. The magnetic stirrer is set to setting four. After approximately one hour, the reaction gels and then the reaction is allowed to cure at 75° C. for three hours. The sample is then removed from the water bath and allowed cool to room temperature.

Fourth Embodiment

An example of the composition is prepared via a ring-opening reaction scheme, as described in Example 12 below.

Example 12: ASA Dimer and Diethylene Triamine

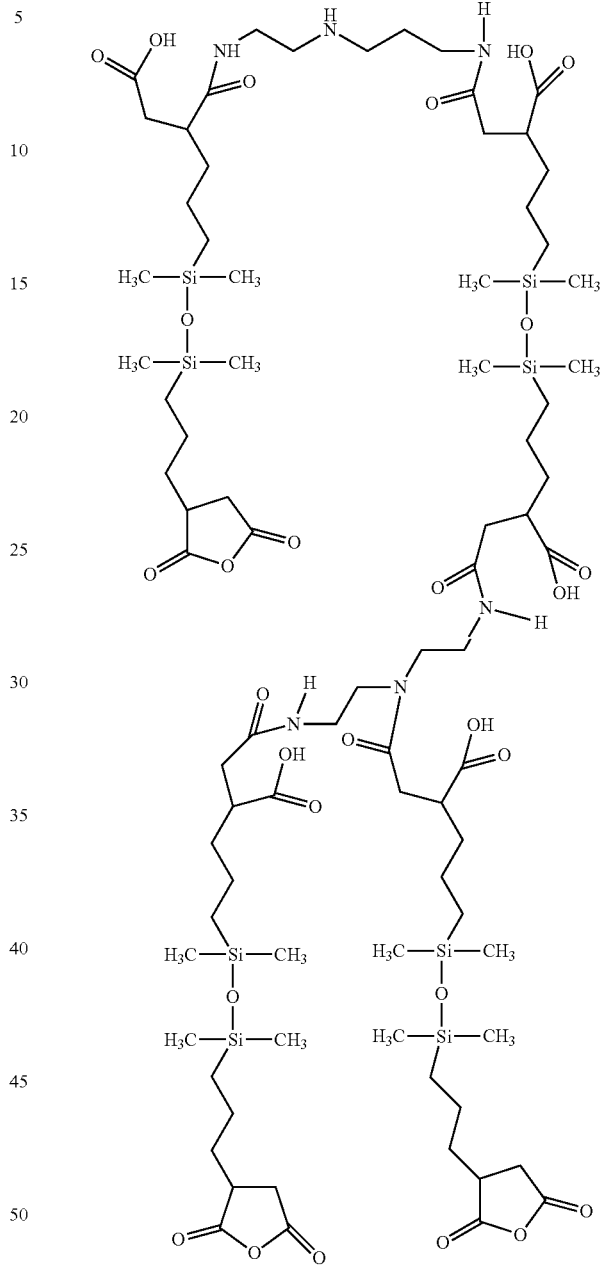

8.05 grams (1 mole) of ASA dimer from Example 1, 1.95 grams (1 mole) of diethylene triamine, and 40.0 grams of isododecane (solvent) are added to a 4 oz olive jar equipped with magnetic star shaped stirrer. The olive jar is placed into a water bath at 80° C. The water bath is positioned above a magnetic stirrer hot plate. The magnetic stirrer is set to setting four and the sample begins to stir. After the reaction gels the reaction is allowed to cure at 75° C. for three hours. The sample is then removed from the water bath and allowed cool to room temperature.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A cross-linked composition comprising the reaction product of:
   a first reactant having at least two hydroxyl groups;
   a second reactant having at least two hydroxyl groups; and
   a siloxane having at least two terminal anhydride groups reactive with the hydroxyl groups of said first and second reactants;
   wherein said first reactant is selected from the group of;
      i) a first siloxane different from said siloxane and having at least two hydroxyl groups,
      ii) a first organic alcohol having at least two hydroxyl groups, or
      iii) a combination thereof; and
   wherein said second reactant is selected from the group of;
      i) a second siloxane different from said siloxane and having at least two hydroxyl groups,
      ii) a second organic alcohol having at least two hydroxyl groups, or
      iii) a combination thereof.

2. The cross-linked composition as set forth in claim 1, wherein:
   i) said first reactant comprises said first siloxane having at least two hydroxyl groups, alternatively at least two pendant hydroxyl groups;
   ii) said second reactant comprises said second siloxane having at least two hydroxyl groups, alternatively at least two pendant hydroxyl groups; or
   iii) both i) and ii).

3. The cross-linked composition as set forth in claim 2, wherein:
   i) said first siloxane has at least three hydroxyl groups, alternatively at least three pendant hydroxyl groups;
   ii) said second siloxane has at least three hydroxyl groups, alternatively at least three pendant hydroxyl groups; or
   iii) both i) and ii).

4. The cross-linked composition as set forth in claim 1, wherein:
   i) said first reactant comprises said first organic alcohol having at least two hydroxyl groups, alternatively at least three hydroxyl groups;
   ii) said second reactant comprises said second organic alcohol having at least two hydroxyl groups, alternatively at least three hydroxyl groups; or
   iii) both i) and ii).

5. The cross-linked composition as set forth in claim 4, wherein:
   i) said first organic alcohol has at least one pendant hydroxyl group;
   ii) said second organic alcohol has at least one pendant hydroxyl group; or
   iii) both i) and ii).

6. The cross-linked composition as set forth in claim 1, wherein said siloxane has two terminal anhydride groups.

7. The cross-linked composition as set forth in claim 1, wherein said siloxane is of the following general formula (A):

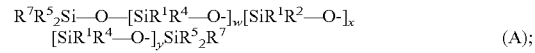

each $R^7$ is a terminal anhydride group of the following general formula (B):

each of $R^1$, $R^2$, $R^4$, and $R^5$ is an independently selected substituted or unsubstituted hydrocarbyl group, alternatively $R^1$ is an independently selected alkyl group, alternatively $R^4$ is an independently selected alkyl group, aryl group, or polyether group having from 2 to 49 ether linkages and terminated with —$OR^6$, wherein $R^6$ is an alkyl group or aryl group, and/or alternatively $R^5$ is $R^1$; $R^3$ is a divalent group, alternatively $R^3$ is $(CH_2)_n$ where n is an integer selected from 1 to 30; w is an integer selected from 0 to 1,000, alternatively 0 to 300; x is an integer selected from 0 to 100, alternatively 0 to 75; and y is an integer selected from 0 to 1,000, alternatively 0 to 300.

8. The cross-linked composition as set forth in claim 7, wherein said siloxane is of the following general formula (A1):

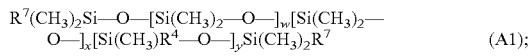

$R^7(CH_3)_2Si$—O—[$Si(CH_3)_2$—O—]$_w$[$Si(CH_3)_2$—
O—]$_x$[$Si(CH_3)R^4$—O—]$_y$$Si(CH_3)_2R^7$ (A1);

$R^3$ of $R^7$ is $(CH_2)_n$ where n is an integer selected from 1 to 15, alternatively 3; $R^4$ is an independently selected alkyl having from 2 to 20 carbon atoms; w is an integer selected from 0 to 200, alternatively 0 to 125; x is an integer selected from 0 to 50, alternatively 0 to 5; and y is an integer selected from 0 to 200, alternatively 0 to 5.

9. The cross-linked composition as set forth in claim 1, wherein each of said first and second siloxanes is individually of the following general formula (C):

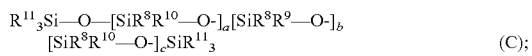

$R^{11}{}_3Si$—O—[$SiR^8R^{10}$-O-]$_a$[$SiR^8R^9$—O-]$_b$
[$SiR^8R^{10}$—O-]$_c$$SiR^{11}{}_3$ (C);

each $R^9$ is of the following formula (D):

—[Z]$_d$—V (D);

V is OH; Z is a divalent group, alternatively Z comprises at least one of a hydrocarbylene, heterohydrocarbylene, or organoheterylene group; each of $R^8$ and $R^{11}$ is an independently selected substituted or unsubstituted hydrocarbyl group, alternatively each of $R^8$ and $R^{11}$ is an independently selected alkyl group; each $R^{10}$ is an independently selected alkyl group, aryl group, or polyether group having from 2 to 49 ether linkages and terminated with —$OR^6$, wherein $R^6$ is an alkyl group or aryl group; a is an integer selected from 0 to 1,000; b is an integer selected from 1 to 200; c is an integer selected from 0 to 1,000; and each d is independently 0 or 1, alternatively 1.

10. The cross-linked composition as set forth in claim 9, wherein d is 1 and Z comprises at least one structural unit selected from the group consisting of:
i) [$(CH_2)_i$]$_k$;
ii) [$(CH_2)_iO$]$_k$;
iii) [$(CH_2)_i(CH)(CH_3)O$]$_k$;
iv) [$(CH_2)_i(CH)(CH_2)_j(CH_3)O$]$_k$;
v) [(CH)OH]$_k$;
vi) [(CH)$(CH_2)_i$OH]$_k$;
vii) [$(CH_3)_2COH(CH_2)_i$]$_k$;
viii) [$(CH_3)(CH_2)_iCOH(CH_2)_j(CH_3)$]$_k$;
ix) [$(CH_2)_iNH(CH_2)_j$]$_k$;
x) [$(CH_2)_iN(CH_2)_j(CH_3)$]$_k$; and
xi) combinations thereof;
where i is an integer selected from 1 to 100; j is an integer selected from 1 to 100; and k is an integer selected from 1 to 100.

11. The cross-linked composition as set forth in claim 1, wherein each of said first and second siloxanes is individually a resin of the general formula $R^*{}_sSiO_{(4-s)/2}$ where $R^*$ is an independently selected substituted hydrocarbyl group, unsubstituted hydrocarbyl group, or hydroxyl group, and s is from greater than 0 to 3.

12. The cross-linked composition as set forth in claim 1, wherein:
i) at least one of said organic alcohols has the following general formula; HO—$R^8$—OH, where $R^8$ is a hydrocarbylene group having from 1 to 40 carbon atoms, alternatively 1 to 10 carbon atoms; and/or
ii) at least one of said organic alcohols is a polyether diol.

13. The cross-linked composition as set forth in claim 12, wherein each of said organic alcohols independently has the following general formula: HO—$R^8$—OH; where $R^8$ is a hydrocarbylene group having from 1 to 40 carbon atoms, alternatively 1 to 10 carbon atoms.

14. The cross-linked composition as set forth in claim 1, wherein each of said organic alcohols is free of silicon.

15. The cross-linked composition as set forth in claim 1, having free carboxyl groups provided by said siloxane and optionally, a carboxyl equivalent of from 100 to 50,000 g/mol.

16. A cross-linked composition of the following general formula (I):

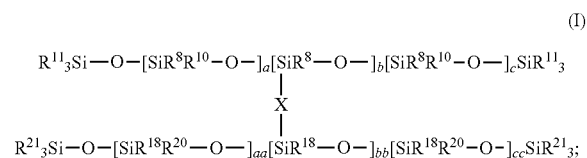

(I)

$R^{11}{}_3Si$—O—[$SiR^8R^{10}$—O—]$_a$[$SiR^8$—O—]$_b$[$SiR^8R^{10}$-O—]$_c$$SiR^{11}{}_3$
                                |
                                X
$R^{21}{}_3Si$—O—[$SiR^{18}R^{20}$—O—]$_{aa}$[$SiR^{18}$—O—]$_{bb}$[$SiR^{18}R^{20}$-O—]$_{cc}$$SiR^{21}{}_3$;

wherein each X is of the following general formula (i);

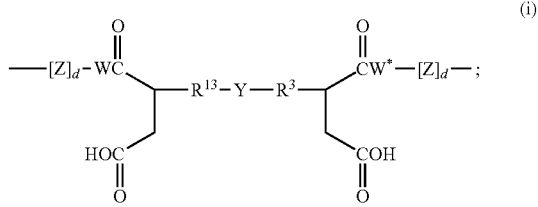

(i)

each Y is of the following formula (ii);

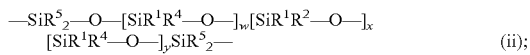

—$SiR^5{}_2$—O—[$SiR^1R^4$—O—]$_w$[$SiR^1R^2$—O—]$_x$
[$SiR^1R^4$—O—]$_y$$SiR^5{}_2$— (ii);

each of W and W* is an oxygen atom (O); each of Z, $R^3$, and $R^{13}$ is an independently selected divalent group, alternatively Z comprises at least one of a hydrocarbylene, heterohydrocarbylene, or organoheterylene group; each of $R^1$, $R^2$, $R^4$, $R^5$, $R^8$, $R^{18}$, $R^{10}$, $R^{20}$, $R^{11}$, and $R^{21}$ is an independently selected substituted or unsubstituted hydrocarbyl group, alternatively each $R^4$ is an independently selected alkyl group having from 2 to 20 carbon atoms, and/or alternatively each of $R^{10}$ and $R^{20}$ is an independently selected alkyl group having from 2 to 20 carbon atoms; each of a and aa is an independently selected integer from 0 to 1,000; each of b and bb is an independently selected integer from 2 to 200; each of c and cc is an independently selected integer from 0 to 1,000; each d is independently 0 or 1; w is an integer selected from 0 to 1,000; x is an integer selected from 0 to 100; and y is an integer selected from 0 to 1,000.

17. The cross-linked composition as set forth in claim 16, wherein each of $R^1$, $R^2$, $R^5$, $R^8$, $R^{18}$, $R^{11}$, and $R^{21}$ is an independently selected alkyl group; $R^3$ is $(CH_2)_n$ where n is an integer selected from 1 to 30, alternatively 1 to 15; $R^{13}$ is $(CH_2)_{nn}$ where nn is an integer selected from 1 to 30, alternatively 1 to 15; each $R^4$ is an independently selected alkyl group, or aryl group; each of $R^{10}$ and $R^{20}$ is an independently selected alkyl group, or aryl group; each of a and aa is an independently selected integer from 0 to 500; each of b and bb is an independently selected integer from 2 to 100; each of c and cc is an independently selected integer from 0 to 500; w is an integer selected from 0 to 300; x is an integer selected from 0 to 75; and y is an integer selected from 0 to 300.

18. The cross-linked composition as set forth in claim 16, wherein d is 1 and Z comprises at least one structural unit selected from the group consisting of:

i) $[(CH_2)_i]_k$;
ii) $[(CH_2)_iO]_k$;
iii) $[(CH_2)_i(CH)(CH_3)O]_k$;
iv) $[(CH_2)_i(CH)(CH_2)_j(CH_3)O]_k$;
v) $[(CH)OH]_k$;
vi) $[(CH)(CH_2)_iOH]_k$;
vii) $[(CH_3)_2COH(CH_2)_i]_k$;
viii) $[(CH_3)(CH_2)_iCOH(CH_2)_j(CH_3)]_k$;
ix) $[(CH_2)_iNH(CH_2)_i]_k$;
x) $[(CH_2)_iN(CH_2)_j(CH_3)]_k$; and
xi) combinations thereof;

where i is an integer selected from 1 to 100; j is an integer selected from 1 to 100; and k is an integer selected from 1 to 100.

* * * * *